US011209335B2

(12) United States Patent
Ono et al.

(10) Patent No.: US 11,209,335 B2
(45) Date of Patent: Dec. 28, 2021

(54) MONITORING SYSTEM AND ITS METHOD

(71) Applicant: HITACHI, LTD., Tokyo (JP)

(72) Inventors: Kazuo Ono, Tokyo (JP); Yuudai Kamada, Tokyo (JP); Ryosuke Fujiwara, Tokyo (JP); Takashi Endo, Tokyo (JP)

(73) Assignee: HITACHI, LTD., Tokyo (JP)

( * ) Notice: Subject to any disclaimer, the term of this patent is extended or adjusted under 35 U.S.C. 154(b) by 438 days.

(21) Appl. No.: 16/251,580

(22) Filed: Jan. 18, 2019

(65) Prior Publication Data
US 2019/0310158 A1 Oct. 10, 2019

(30) Foreign Application Priority Data
Apr. 6, 2018 (JP) .............................. JP2018-073703

(51) Int. Cl.
*G01M 3/24* (2006.01)
*G06F 17/15* (2006.01)
*G06F 17/14* (2006.01)

(52) U.S. Cl.
CPC ............ *G01M 3/24* (2013.01); *G06F 17/14* (2013.01); *G06F 17/15* (2013.01)

(58) Field of Classification Search
CPC .......... G01M 3/24; G06F 17/15; G06F 17/14; Y02A 20/15; E03B 7/071; E03B 7/003; E03F 3/00
See application file for complete search history.

(56) References Cited

U.S. PATENT DOCUMENTS

2006/0137090 A1* 6/2006 Jeffries ............... G01M 3/2807
4/664
2012/0007743 A1* 1/2012 Solomon ................. G01F 1/66
340/605

FOREIGN PATENT DOCUMENTS

| JP | 07-147566 A | 6/1995 |
| JP | 2003-502678 A | 1/2003 |
| JP | 2006-153855 A | 6/2006 |
| JP | 2015-163903 A | 9/2015 |
| JP | 2016-142619 A | 8/2016 |

(Continued)

OTHER PUBLICATIONS

Japanese Office Action dated Aug. 3, 2021 for Japanese Patent Application No. 2018-073703.

*Primary Examiner* — Xin Y Zhong
(74) *Attorney, Agent, or Firm* — Volpe Koenig

(57) ABSTRACT

A monitoring system includes a plurality of sensor terminals installed for a target to be measured, a base station wirelessly communicating with the sensor terminals, and a calculator communicable with the base station. The sensor terminal includes a sensor element which acquires vibration information of a target to be measured, an arithmetic unit which performs an arithmetic operation for data including the vibration information of the sensor element, and a wireless communication unit. The arithmetic unit performs a reduction process for reducing an amount of data of the sensor element. The wireless communication unit transmits data processed by the arithmetic unit to the base station. After the transmitted data is received, the base station transmits it to the calculator. The calculator includes a signal processing (Continued)

unit. The signal processing unit complements the reduction-processed data to acquire vibration information, and averages the vibration information for a predetermined period of time.

13 Claims, 24 Drawing Sheets

(56) References Cited

FOREIGN PATENT DOCUMENTS

| | | |
|---|---|---|
| JP | 2017-187337 A | 10/2017 |
| JP | 2017-198576 A | 11/2017 |
| WO | 2000/079425 A | 12/2000 |

* cited by examiner

UPLINK COMMUNICATION

DOWNLINK COMMUNICATION

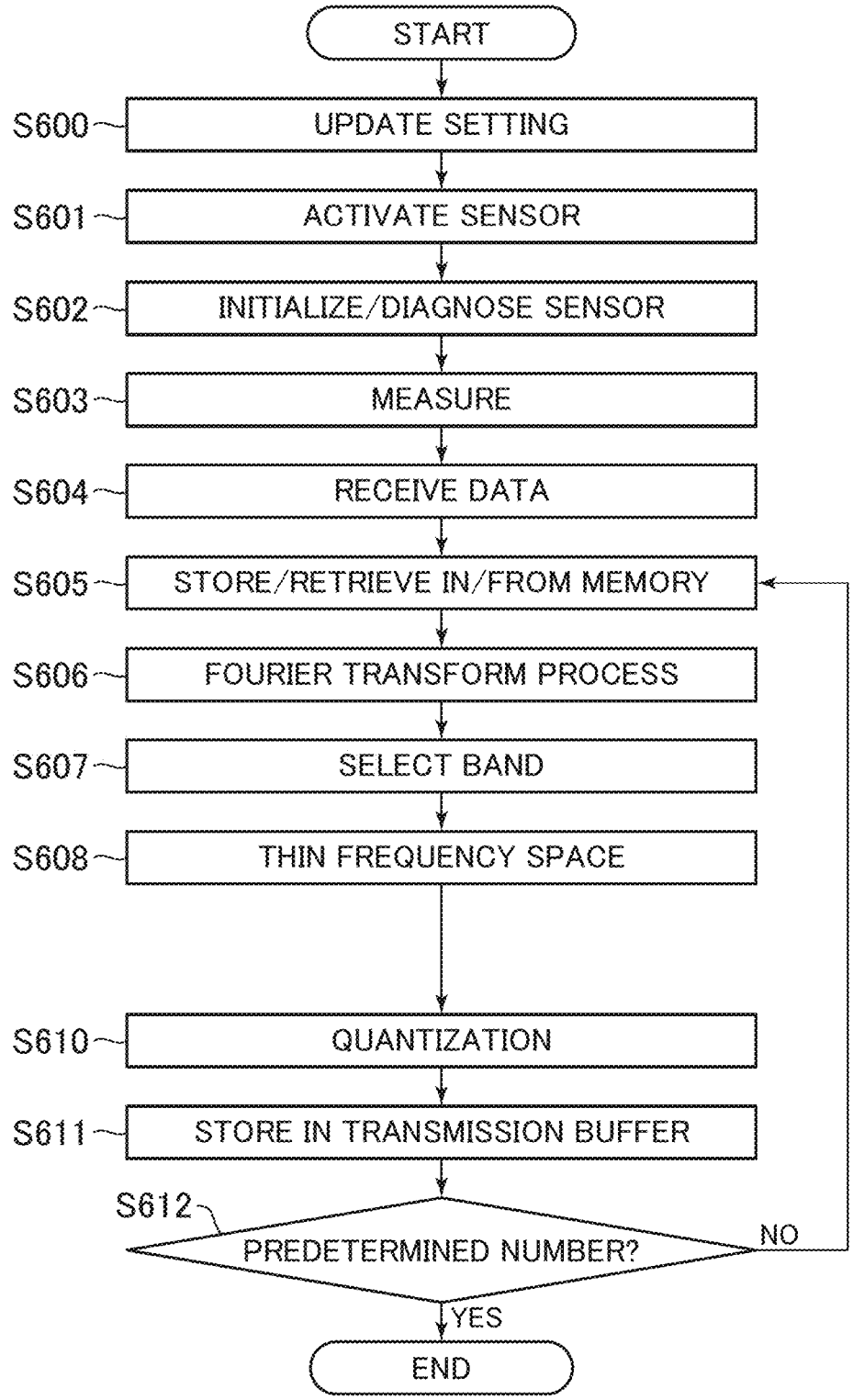

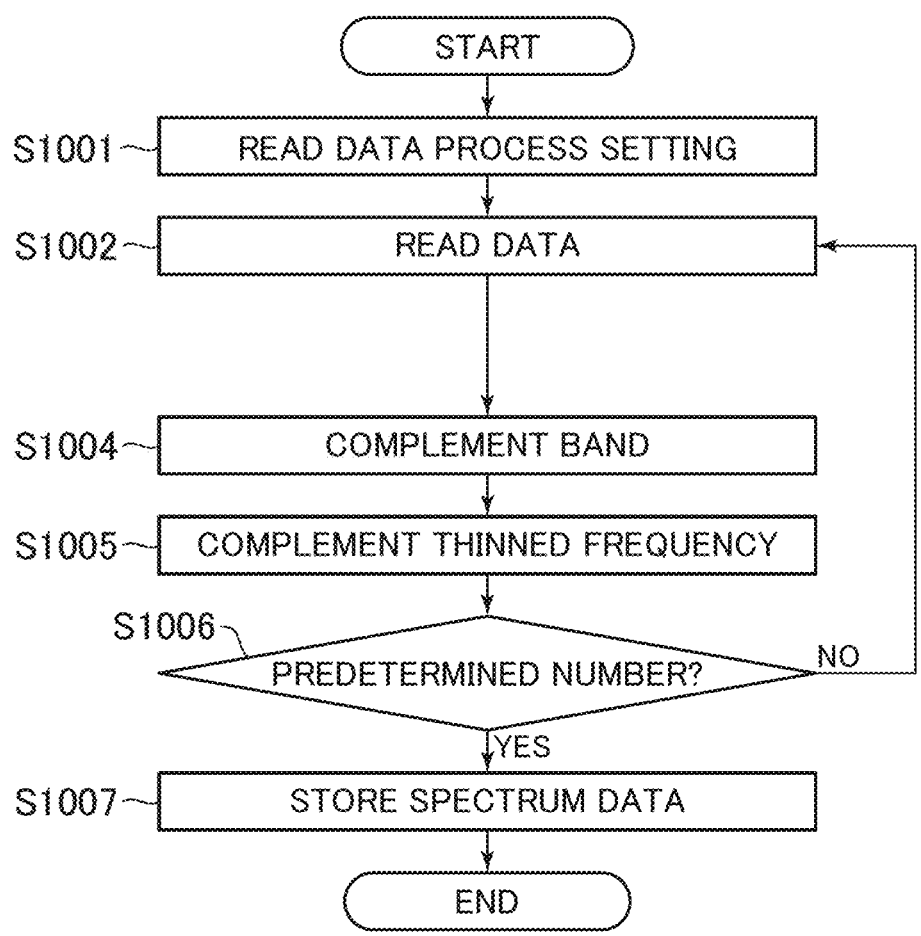

FIG. 22

SENSOR TERMINAL MANAGEMENT INFORMATION  2200

| | | |
|---|---|---|
| 2201 | TERMINAL ID | |
| 2202 | SETTING INFORMATION | SENSOR ACTIVATION CYCLE |
| | | NUMBER OF DATA ITEMS TO BE ACQUIRED |
| | | SAMPLING FREQUENCY |
| | | MEASUREMENT TIME |
| | | MEASUREMENT INTERVAL |
| | | NUMBER OF DATA ITEMS TO BE FOURIER-TRANSFORMED |
| | | BAND SELECTION INFORMATION |
| | | THINNING INFORMATION OF FREQUENCY SPACE |
| | | NUMBER OF QUANTIZATION BITS |

FIG. 23

SYSTEM MANAGEMENT INFORMATION 2300

| | | |
|---|---|---|
| 2301 — | TERMINAL ID | |
| 2302 — | SETTING INFORMATION | SENSOR ACTIVATION CYCLE |
| | | NUMBER OF DATA ITEMS TO BE ACQUIRED |
| | | SAMPLING FREQUENCY |
| | | MEASUREMENT TIME |
| | | MEASUREMENT INTERVAL |
| | | NUMBER OF DATA ITEMS TO BE FOURIER-TRANSFORMED |
| | | BAND SELECTION INFORMATION |
| | | THINNING INFORMATION OF FREQUENCY SPACE |
| | | NUMBER OF QUANTIZATION BITS |
| 2303 — | INSTALLATION POSITION | |
| 2304 — | AVERAGING TIME | |

PAIR LIST 2400

|   | TERMINAL ID | TERMINAL ID |
|---|---|---|
| 2401 — 1 | 0001 | 0002 |
| 2402 — 2 | 0002 | 0003 |
| 3 | 0003 | 0004 |

MONITORING SYSTEM AND ITS METHOD

BACKGROUND

The present invention relates to a monitoring technique for buried pipe infrastructure. The present invention relates, for example, to a technique for detecting water leakage, using a sensor which detects abnormal vibration of a pipe due to water leakage from a buried water pipe.

In recent years, it is important to understand deterioration of the social infrastructure (water supply pipes, sewerage pipes, gas pipes, power transmission lines, roads, tunnels, bridges, harbors, any other public buildings), and to maintain the infrastructure. A diagnostic method for the damage state of the infrastructure on site has been developed and practically used.

Repairing of buried pipe infrastructure, including water supply and sewerage systems, gas, and electricity, is usually performed, since the damage is apparent. When water leakage occurs in the water supply and sewerage systems, it is fairly common to perform the repair only after the abnormality (for example, water leakage in the ground) is identified. In addition, an underground cavity is formed near the point of leakage due to water pressure of the leakage under the ground, and it grows bigger. This causes an accident that the ground surface is sunk. There is a demand of technology for detecting the water leakage at the time of only a small amount of water leakage before occurrence of the serious accident, for quick repair thereof.

In the buried pipe infrastructure, water supply pipes, gas, and electricity may be arranged adjacent to each other. In this case, it is known that a secondary damage is generated. That is, when leakage occurs in the water supply pipes, the surrounding sediment is stirred up by the water pressure of jetted water, resulting in damaging the surrounding gas pipe or electric cable. To prevent the multiple accidents due to the water leakage, it is desired to quickly detect the water leakage from the buried water pipes.

There is proposed a technique for arranging a sensor terminal on the buried water pipe, analyzing vibration of the water pipes, and detecting the water leakage, as a water leakage detection method. The IoT technology for various items connected to the Internet progresses remarkably. For example, there is proposed a system for wirelessly collecting and analyzing signals from many sensor terminals. There is remarkably developed a system for quickly finding the abnormality by monitoring information regarding the buried pipes, using a sensor terminal which is always provided for the buried pipe infrastructure through the communication network. For example, Japanese Unexamined Patent Application Publication (Translation of PCT Application) No. 2003-502678 discloses a technique for specifying the position of the water leakage by analyzing the cross-correlation function of signals from a plurality of sensors.

SUMMARY

As a monitoring system (for example, a water leakage detection system), sensor terminals are always provided on the buried pipe, and a system for collecting data through a wireless channel for IoT is preferable from the viewpoints of the maintenance and operation cost and the communication cost. To reduce the wireless communication cost as much as possible, one base station preferably manages as many sensor terminals as possible. In this case, the baseband for use in communication has been set. Thus, when to manage many sensor terminals, an amount of data communication assigned to each of the individual sensor terminals is restricted small. That is, it is difficult to collect any sound or vibration waveform acquired by the sensor terminals as is or to use it for a signal process, due to the restricted communication amount of the wireless communication. Japanese Unexamined Patent Application Publication (Translation of PCT Application) No. 2003-502678 provides descriptions about filtering. However, to manage many sensor terminals, it is demanded to further reduce the data amount.

It is necessary to reduce the data amount and to maintain a required signal-to-noise ratio (SNR). Particularly, improvement of the SNR causes to extend a detection distance of the sensor terminals. This results in lowering the installation density of the terminals, and monitoring the buried pipes in a wide range using fewer terminals. It also results in decreasing the cost of the entire system.

There is provided a monitoring system which maintains or improves the SNR, and detects a state of a target object to be measured, while reducing a communication cost for the sensor terminals.

According to one aspect of the present invention, there is provide a monitoring system including a plurality of sensor terminals which are installed for a target object to be measured, abase station which wirelessly communicates with the sensor terminals, and a calculator which can communicate with the base station. Each of the sensor terminals includes a sensor element which acquires vibration information of the target to be measured, an arithmetic unit which performs an arithmetic operation for data including the vibration information of the sensor terminal, and a wireless communication unit. The arithmetic unit performs a reduction process for reducing an amount of data of the sensor element. The wireless communication unit transmits data processed by the arithmetic unit to the base station. The base station receives the transmitted data, and transmits it to the calculator. The calculator includes a signal processing unit. The signal processing unit complements the reduction-processed data to acquire vibration information, and averages the vibration information for a predetermined period.

According to another aspect of the present invention, there is provided a monitoring method, using a plurality of sensor terminals installed for a target to be measured, a base station wirelessly communicating with the sensor terminals, and a calculator communicable with the base station. The sensor terminal includes a sensor element which acquires vibration information for a target to be measured, an arithmetic unit which performs an arithmetic operation for data including the vibration information of the sensor element, and a wireless communication unit. The arithmetic unit performs a reduction process for reducing an amount of data of the sensor element, and quantizing it. The wireless communication unit transmits the data processed by the arithmetic unit to the base station. The base station receives the transmitted data, and then transmits it to the calculator. The calculator includes a signal processing unit. The signal processing unit complements the reduction-processed data to acquire vibration information, and averages the vibration information for a predetermined period of time.

According to the present invention, in the monitoring system, while reducing the cost of the communication for the sensor terminals, it is possible to maintain or improve the SNR, and to detect the state of the target object to be measured. Any objects, configurations, and effects other than the above will be apparent from the descriptions of the preferred embodiments of the present invention.

BRIEF DESCRIPTION OF THE DRAWINGS

FIG. 16 is a flowchart illustrating a self correlation analysis, according to a second embodiment;

FIG. 18 is a flowchart illustrating a signal pre-process on the cloud side, according to the second embodiment;

FIG. 22 is a diagram illustrating a configuration of sensor terminal management information;

FIG. 23 is a diagram illustrating a configuration of system management information; and FIG. 24 is a diagram illustrating a configuration of a pair list.

DETAILED DESCRIPTION

Figure 1:
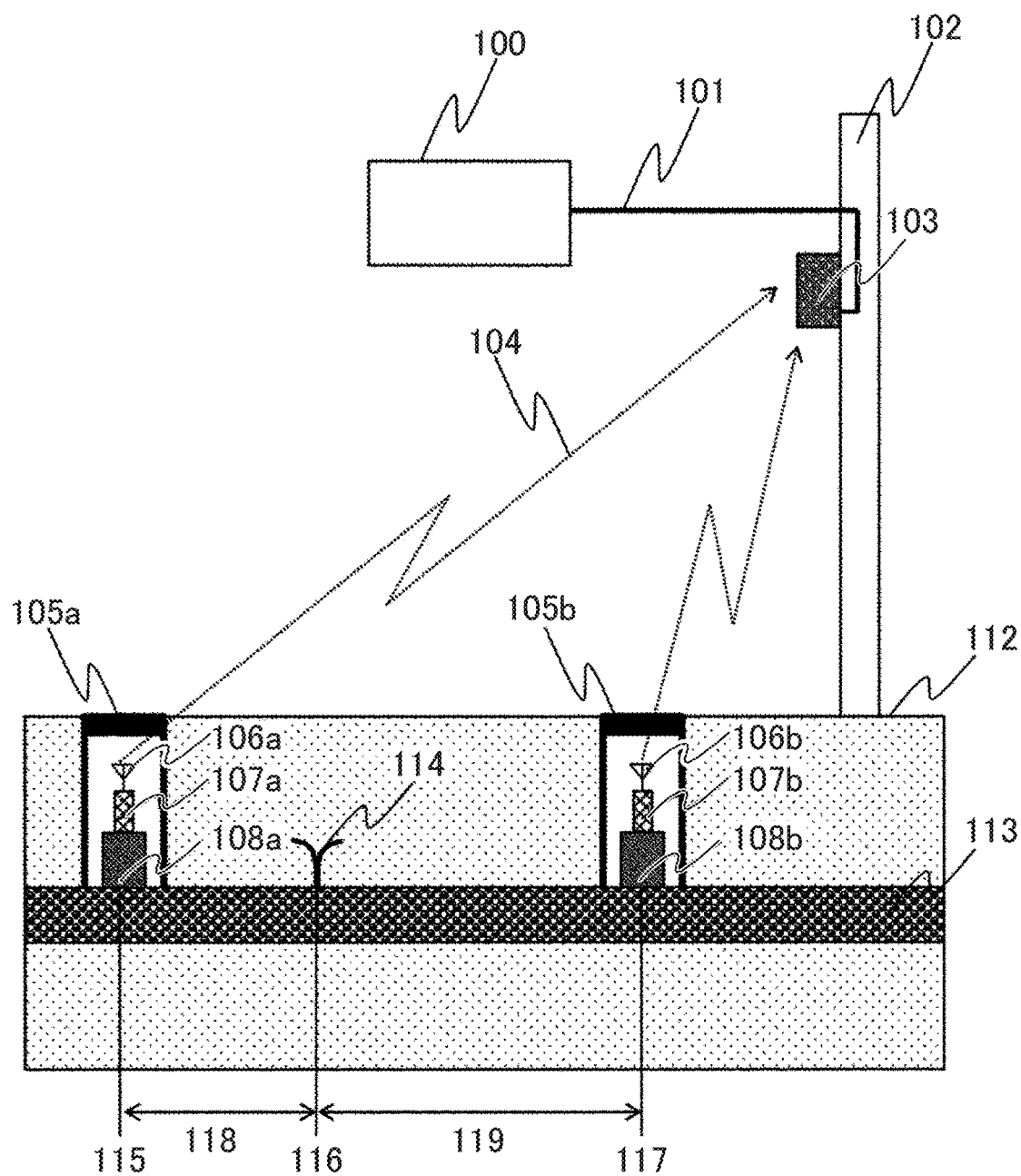
FIG. 1 is a diagram illustrating a configuration example of a monitoring system, which includes sensor terminals installed on the buried pipes and collects information through wireless communication, to analyze data.

Descriptions will now specifically be made to preferred embodiments of the present invention based on accompanying drawings. In the entire drawings for describing the preferred embodiments, the same parts will be identified by the same reference numerals, and will not substantially be described over and over.

If there are a plurality of elements having the same or similar function, the same numeral may be given with different indexes added thereto for the sake of description. If there is no need to distinguish between the plurality of elements, the indexes may not be given in the description.

The notation of "first", "second", and "third" in this specification is given to identify the constituent elements, and is not to necessarily limit the number, the order, and the contents thereof. The numbers for identifying the constituent elements are used in accordance with the contexts. One number used in one context may not necessarily be used to represent the same configuration in another context. It is not prevented that a constituent element identified with one number also serves as the function of a constituent element identified with another number.

The position, size, form, and range of each configuration in the drawings may not represent the actual position, size, form, and range, for the sake of easy understanding of the present invention. Thus, the present invention is not necessarily limited to the position, size, form, and range disclosed in the drawings.

Each information item may be described in the expression of a table. However, the data structure of each information item is not limited, and may be in a form of another data structure. Each information item does not depend on the data structure. For example, "kkk list" may be referred to as "kkk information".

The constituent elements expressed in the form of a singular form in this specification include a plural form, unless it is obviously explained in a particular context.

Descriptions will now be made to leakage detection of water supply pipes by way of example as a buried pipe infrastructure monitoring system. The same system is applicable to leakage detection of gas pipes, by changing the characteristics of the sensor element arranged in the sensor terminal. The typical system thereof will briefly be described as follows.

A buried pipe infrastructure monitoring system according to an embodiment a plurality of sensor terminals which are provided in contact with the buried pipe, a plurality of base stations which wirelessly communicate with the sensor terminals, and a calculator. Each of the sensor terminals includes a sensor element measuring vibration of the buried pipe, an arithmetic performing an arithmetic operation for data of the sensor element, and a wireless communication unit. The sensor terminals are intermittently operated to measure vibration of the buried pipe. The calculator performs averaging for obtained vibration measurement results for a predetermined period except for a result with an especially high intensity, thereby determining an abnormality of the buried pipe. More specifically, the buried pipe infrastructure monitoring system calculates integral intensities for power spectrums of a plurality of outputs from the sensor terminal, in the entire frequencies, and removes any power spectrum having discontinuous intensities based on a time-series trend. Then, it averages the data with a predetermined number of past spectrum data items. In this manner, a plurality of fragmentary measurement data items are averaged after deleting those discontinuous parts of the signal intensities in time series, thereby enabling to provide a buried pipe infrastructure monitoring system having high accuracy. For example, not only in specification of the position of the water leakage, but also in determination as to whether water leakage has occurred, a plurality of sensor information items are compared for a long period of time over a plurality of days, thereby improving the determination accuracy.

First Embodiment

FIG. 1 is a diagram illustrating a configuration example of a monitoring system which includes sensor terminals installed on the buried pipes and collects information through wireless communication, to analyze data. FIG. 1 illustrates an example of the connection relationship between a buried water pipe 113, sensor terminals 107, a base station 103, and a calculator 100. The buried water pipe 113 includes a plurality of valves 108 for generally controlling the water flow, and has utility spaces 105 for the operator to operate the valves 108 from a road surface 112. The sensor terminals 107 can be installed using the utility spaces 105. In this embodiment, it is assumed that the buried water pipe 113 is a water supply pipe or a sewerage pipe, but a target object to be measured is not limited to this.

A first sensor terminal 107a is installed in contact with a first valve 108a. The first sensor terminal 107a is connected to an antenna 106a. The first sensor terminal 107a performs mutually wireless communication with the base station 103, as illustrated schematically with a line 104. Similarly, a second sensor terminal 107b is provided in contact with a second valve 108b. The second sensor terminal 107b is connected to the antenna 106b, and mutually performs wireless communication with the base station 103. Abnormal vibration due to water leakage 114 from the buried water pipe 113 is detected using the above-described two sensor terminals 107. The abnormal vibration due to the water leakage 114 propagates a distance 118 from a water leakage point 116, and reaches a first sensor terminal 107a. It propagates a distance 119 from the water leakage point 116, and reaches the second sensor terminal 107b. In this embodiment, descriptions will now be made to an example in which wireless communication is performed with using an IoT communication network, and this wireless communication may be referred to as IoT communication.

An installation position 115 of the first sensor terminal 107a and an installation position 117 of the second sensor terminal 107b are recorded as installation positions 2303 of system management information in a data storage 502 of the calculator 100, when these sensor terminals are installed. This results in that the calculator 100 can continuously use the information. The information is used when displaying the position of the sensor terminal 107, in combination with map information. The calculator 100 may, for example, be a server device or a cloud calculator which is configured on the cloud. The calculator 100 is not limited to one device, and may be configured with a plurality of devices. It may be referred to as a calculator system or an information processing system.

The base station 103 may often be installed on a high place, for example, an electric pole 102. This is because if the base station is installed on a low place, and electric waves are hardly received from a remote place due to an effect of the traffic or buildings. The base station 103 and the calculator 100 are connected by high-speed wired communication 101. In the cities, the communication infrastructure, such as an optical fiber, is developed. Thus, it is preferred to build the monitoring system with the infrastructure, for a reduction in the cost. In this embodiment, descriptions will be made to an example of wired communication. Communication between the base station 103 and the calculator 100 may be wired communication, wireless communication, or a combination thereof.

The calculator 100 collects information (for example, vibration information from the buried water pipe 113) from the plurality of sensor terminals 107 (including the first sensor terminal 107a and the second sensor terminal 107b) through the base station 103, detects the water leakage, and specifies the position of the water leakage, based on data analysis. The calculator 100 transmits an instruction (for measurement by the sensor terminal 107 or setting for data processes) for each sensor terminal 107 through the base station 103.

In a monitoring system which transmits and receives data by wireless communication, the capacity of the battery mounted on the sensor terminal 107 is limited. Thus, the sensor terminal 107 is intermittently operated or operated by event-driven, thereby extending the life of the battery. Thus, information (for example, vibration information from the buried water pipe 113) from the sensor terminal 107 may not always be continuously acquired, but may be acquired in fragmentary forms with short periods of time.

Figure 2:
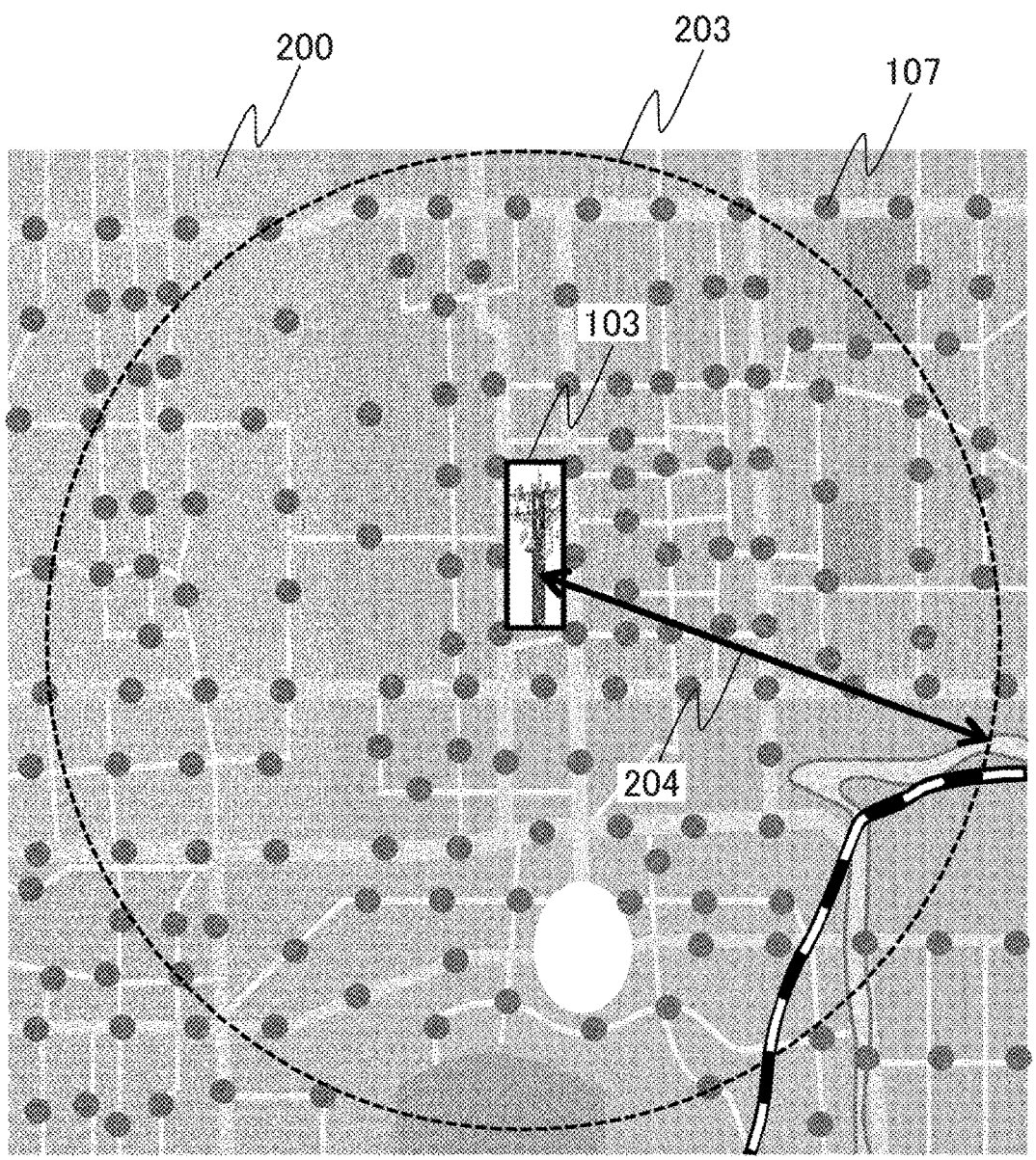
FIG. 2 is an image diagram illustrating collection of information of the sensor terminals installed in a wide range, by a base station.

FIG. 2 schematically illustrates a range that one base station 103 covers in the monitoring system. The plurality of sensor terminals 107 are plotted on a map 200, and the base station 103 covers the range surrounded by a circle 203. In general, the propagation distance of electric waves is isotropic. Thus, the range to be covered is shown in a circular form. It is preferred that a typical radius 204 thereof is, for example, approximately several kilometers from the viewpoint of the cost, though it depends on the characteristics or surrounding situations of the base station 103 or the sensor terminal 107. It is preferred that one base station 103 manages the sensor terminals as many as possible. When wide range monitoring is performed, it is preferred to extend the distance that one sensor terminal 107 can detect the water leakage, from the viewpoint of the cost.

Figure 3:
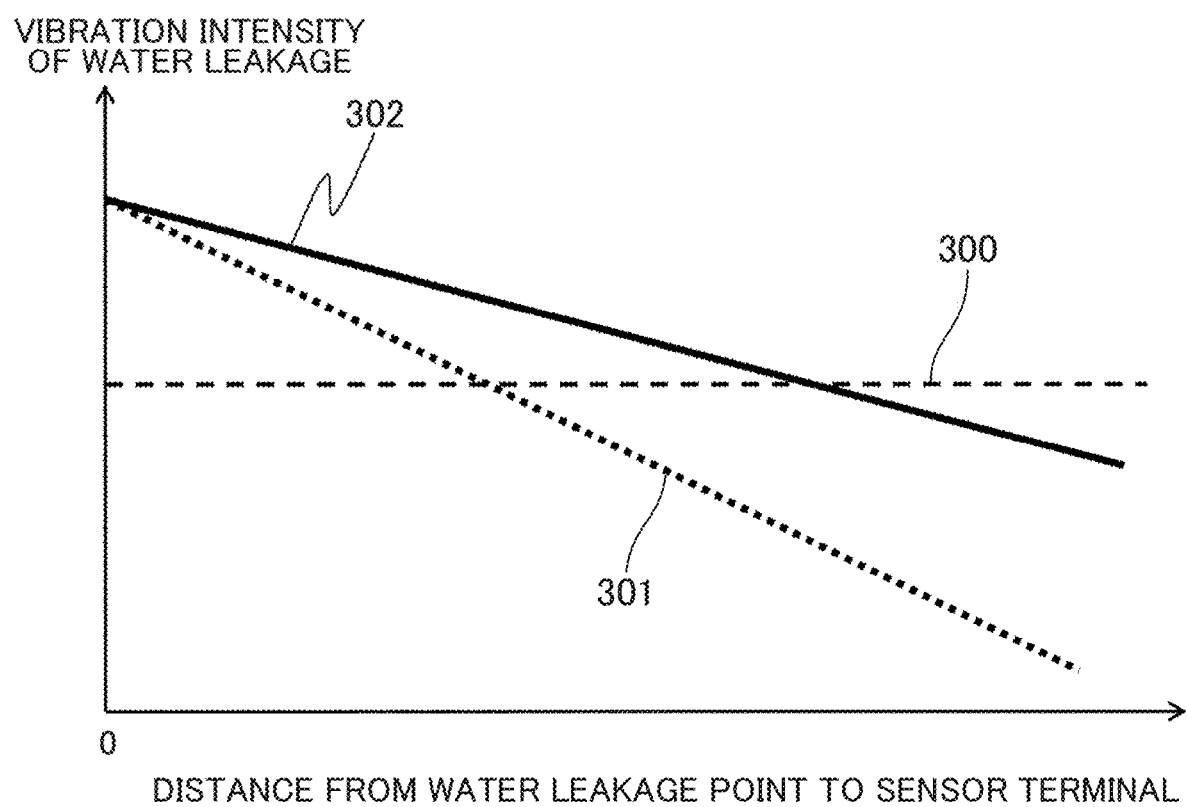
FIG. 3 is a diagram illustrating a graph representing propagation characteristics of the vibration intensity of water leakage.

FIG. 3 illustrates a graph representing the concept of the relationship between the distance from the water leakage point 116 to the sensor terminal 107 and the intensity of an abnormal vibration signal (water leakage vibration) due to the water leakage. With this illustration, descriptions will now be made that it is important to extend the distance that the sensor terminal 107 can detect the water leakage.

A point "0" on the horizontal axis represents the water leakage point 116. As separating from the water leakage point 116, the signal intensity exponentially decreases. The distance on the horizontal axis is set in a manner that the attenuation characteristics are on a linear graph. As obvious from the experiment, an attenuation line 302 in a low frequency range of the water leakage signal and an attenuation line 301 in a high frequency range have different slopes, and the signal propagates far, because the attenuation coefficient is smaller on the side of low frequency range. A background noise 300 depends on the noise of its sensor element and the environmental noise in the installation position of the sensor element. Generally speaking, the environmental noise is greater than the noise of its sensor element, and the environmental noise intensity remarkably depends on the installation position of the sensor terminal or the measurement time.

To detect the water leakage signal, the water leakage signal intensity needs to be greater than the background noise 300. To extend the distance that the sensor terminal 107 can detect the water leakage, it is necessary to perform the signal processing for those signals on the side of the low frequency range and to reduce the background noise 300. In this embodiment, there is provided a signal processing method based on this guidance.

Figure 4:
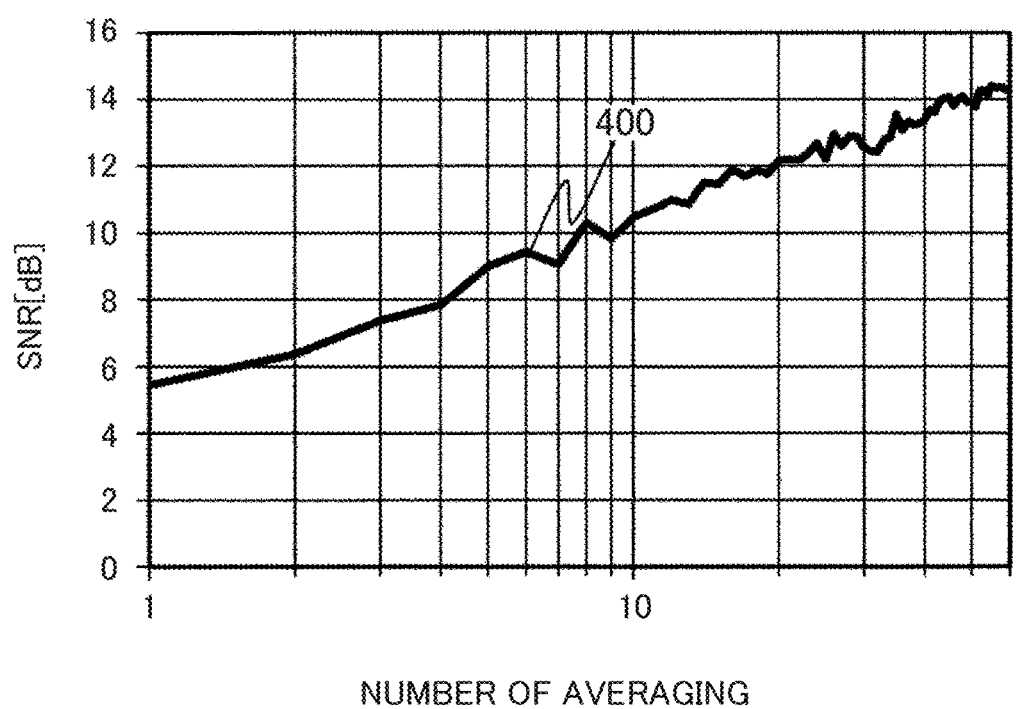
FIG. 4 is a diagram illustrating a graph representing that the SNR is improved by performing an averaging process for signals.

FIG. 4 illustrates the improvement of the signal noise ratio (SNR), when the water leakage signals are averaged for a plural number of times. It is obvious that, as there are many data items to be averaged, the signal noise ratio is improved. That is, the intermittent vibration information items acquired by the sensor terminal 107 are averaged for a long period of time, thereby enabling to improve the SNR. Instead of continuous data items, discretely processed data items are averaged to acquire the information, it is proven that a high SNR signal can be acquired using only few data items.

The background noise 300 illustrated in FIG. 3 is a usual noise, while the water leakage signal is not correlated thereto. Thus, if the integration period is extended, the SNR is improved. This is equivalent to lowering the level of the background noise 300 illustrated in FIG. 3, and implies that the distance the sensor terminal 107 can detect the water leakage can be extended. As a result, it is possible to extend the range to be covered by one sensor terminal 107, thereby decreasing the number of sensor terminals 107 per unit area and providing a low cost monitoring system.

Figure 5:
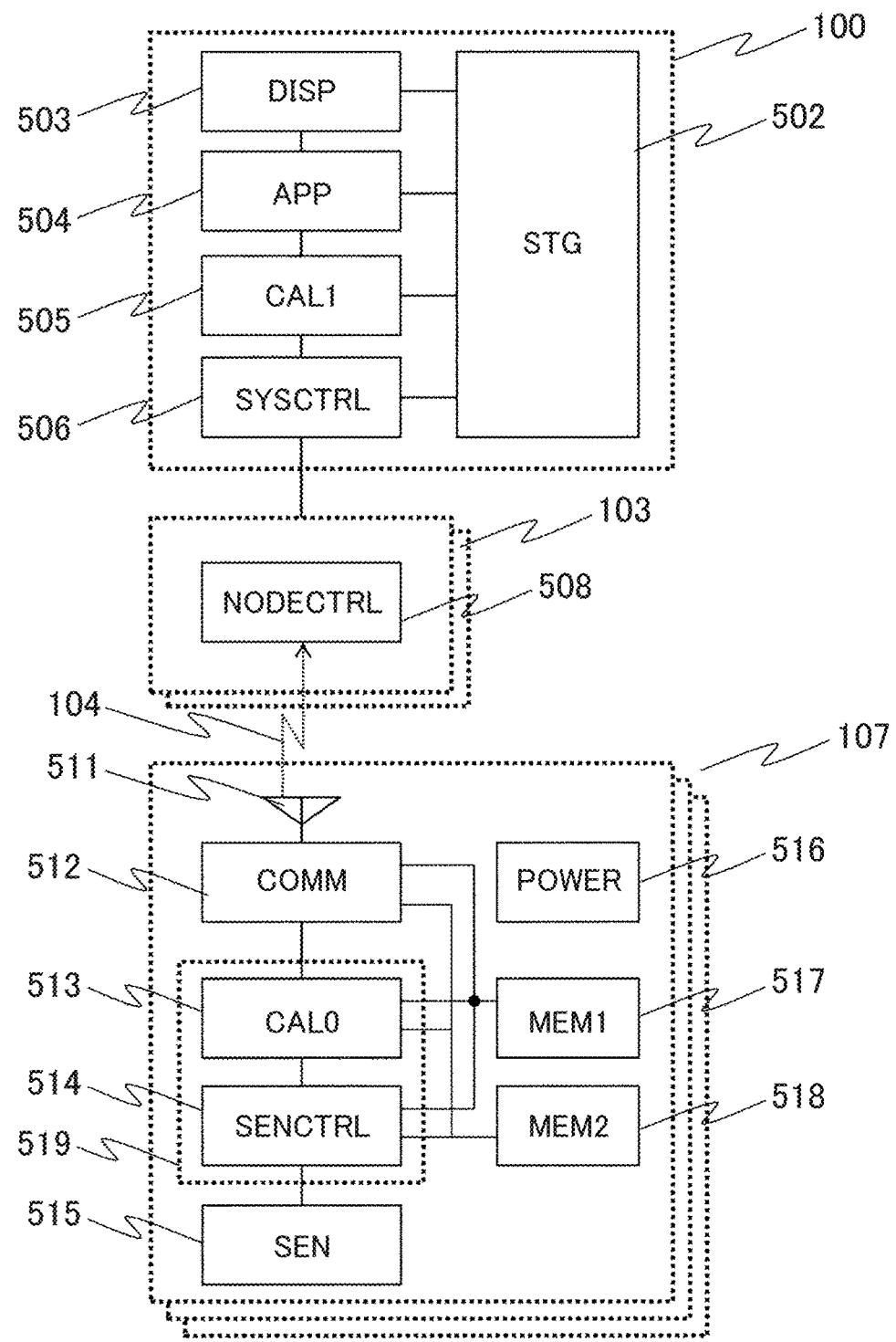
FIG. 5 is a functional block diagram of the entire buried infrastructure monitoring system, according to a first embodiment.

FIG. 5 is a functional block diagram of the monitoring system. The sensor terminal 107 includes an antenna 511 for communication, a communication control unit (COMM) 512, an arithmetic unit 519, a sensor element (SEN) 515, a power source (POWER) 516, an arithmetic memory (MEM1) 517, and a data memory (MEM2) 518. The arithmetic memory 517 and the data memory 518 may be included in the arithmetic unit 519.

The arithmetic unit 519 includes a sensor control unit (SENCTRL) 514 and a signal processing unit (CAL0) 513. The communication control unit 512, the signal processing unit 513, and the sensor control unit 514 are connected to the arithmetic memory 517 and the data memory 518 through data wiring. The power source 516 is a battery, and preferably has a capacity that the sensor terminal 107 can operate without changing the battery at least for a few years. In the arithmetic unit 519, raw data measured by the sensor element 515 is filtered and compressed in data quantity. Thus, the data cannot be restored into the original data. To check the raw data for debugging afterwards, the data memory 518 may have a function for storing the raw data measured by the sensor element 515 in a non-volatile manner. The data memory 518 stores sensor terminal management information 2200.

The sensor element 515 is, for example, an acceleration sensor, but may be any other kind of sensor. The communication control unit 512 and the arithmetic unit 519 may be configured using a, for example, 1-chip microcomputer. The processes executed by the communication control unit 512 or the arithmetic unit 519 are executed in cooperation of a predetermined process with another hardware, such as the arithmetic memory 517, by executing the program stored in the data memory 518 using a microcomputer. The program, its function, or means realizing the function, executed by the calculator, such as a microcomputer, may be referred to as a "function", "means", "section", "unit", or "module". In this embodiment, the same function as that configured by the software may be realized by the hardware, such as an FPGA (Field Programmable Gate Array), ASIC (Application Specific Integrated Circuit). The arithmetic memory 517 may be configured with a volatile memory, for example, a DRAM (Dynamic Random Access Memory), the data memory 518 may be configured with a non-volatile memory, for example, a flash memory.

The base station 103 exchanges information with the sensor terminal 107 through wireless communication. The base station 103 includes a sensor terminal control unit (NODECTRL) 508. The sensor terminal control unit 508 may be a gateway. The sensor terminal control unit 508 communicates with the plurality of sensor terminals 107 in a predetermined range from the base station 103, as illustrated with the circle 203 in FIG. 2, and communicates with the calculator 100, thereby mutually connecting with the calculator 100 and the sensor terminal 107 and relaying communication packets. In this embodiment, when a packet is transmitted/received between the sensor terminal 107 and the calculator 100, communication is made through the above-described base station 103. As an embodiment, each sensor terminal 107 and the calculator 100 may directly communicate with each other, or one or more relay unit may be provided between the sensor terminal 107, the base station 103, and the calculator 100. For example, when the sensor terminal 107 and the base station 103 communicate with each other, communication is made through another sensor terminal 107 as a relay unit, thereby enabling to extend the range that one base station 103 covers.

The calculator 100 includes a system control unit (SYSCTRL) 506, a signal processing unit (CAL1) 505, a cooperation application (APP) 504, a display unit (DISP) 503, and data storage (STG) 502. The system control unit 506 controls the entire system, including the sensor terminal 107. The signal processing unit 505 processes any signal acquired from the sensor terminal 107. The cooperation application 504 specifies, for example, a position of the water leakage, based on a signal processed by the signal processing unit 505. The display unit 503 displays a processing result of the cooperation application 504.

The data storage 502 stores a signal (measurement data) acquired from the sensor terminal 107, a signal processed by the signal processing unit 505, and a processing result of the cooperation application 504. The data storage 502 stores sensor terminal management information 2300 including setting information 2302 of the sensor terminal 107 or installation position 2303, a pair list 2400, and map information. The display unit 503, the cooperation application 504, the signal processing unit 505, and the system control unit 506 are connected with the data storage 502 through a data line, and it may be configured in a manner that the input/output destinations of the functional blocks are the data storage 502. As a result of this configuration, each functional block can independently operate on the calculator 100, and extendability of the functions can be enhanced.

The calculator 100 can be configured with a server including, specifically, an output device, an input device, a processing device, and a memory device. The display unit 503 is an output device, such as a display, and the data storage 502 is a memory device. However, in the configuration of the server, any other input/output device or various memory may be included. The system control unit 506, the signal processing unit 505, and the cooperation application 504 are realized in cooperation of a predetermined process with other hardware, by executing the program stored in the memory device by the processing device. The calculator 100 may be configured with a single computer. Alternately, an arbitrary part of the input device, the output device, the processing device, and the memory device may be configured with another computer connected to the network.

FIG. 22 is a diagram illustrating a configuration of the sensor terminal management information 2200. The sensor terminal management information 2200 is management information stored in the data memory 518 of each sensor terminal 107, and management information regarding the sensor terminal 107 itself. The sensor terminal management information 2200 includes a terminal ID 2201 as identification information for uniquely identifying the corresponding sensor terminal 107 itself and setting information 2202 regarding the sensor terminal 107. The sensor terminal management information 2200 may include different contents in association with the sensor terminal 107.

The terminal ID 2201 is used for communicating between, for example, the sensor terminal 107 and the calculator 100. In the case of uplink communication, the sensor terminal 107 inputs its own terminal ID 2201 into a section of a terminal ID 900 in a packet of FIG. 9A, and transmits measurement data 902. The calculator 100 specifies the sensor terminal 107 which is a transmitter source of the packet and which has measured the measurement data 902, based on the terminal ID 900.

Figure 9A:
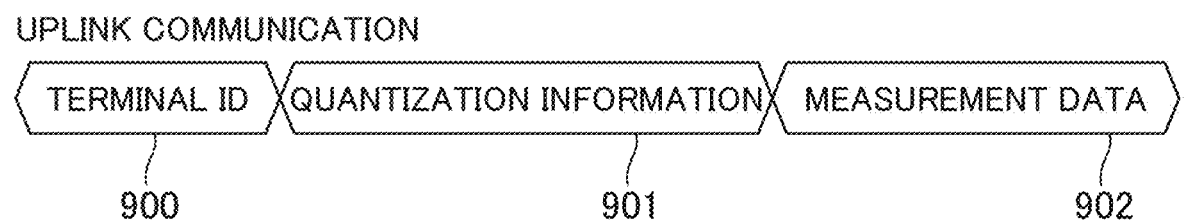
FIG. 9A and FIG. 9B are image diagrams each illustrating a configuration example of a communication packet between the sensor terminal and the base station, according to the first embodiment.
Figure 9B:
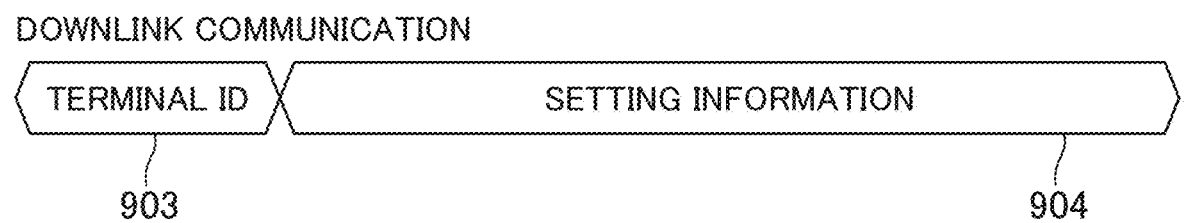

In the case of downlink communication, the calculator 100 inputs the terminal ID 2201 identifying the sensor terminal 107 as the transmitter source into a section of a terminal ID 903 in a packet of FIG. 9B, and transmits it. The sensor terminal 107 which has received this packet collates the terminal ID 903 of the packet and the terminal ID 2201 of the sensor terminal management information 2200 kept by itself. Only when the terminals IDs coincide with each other, it may be judged that this corresponding packet is one for its sensor terminal 107.

Figure 6:
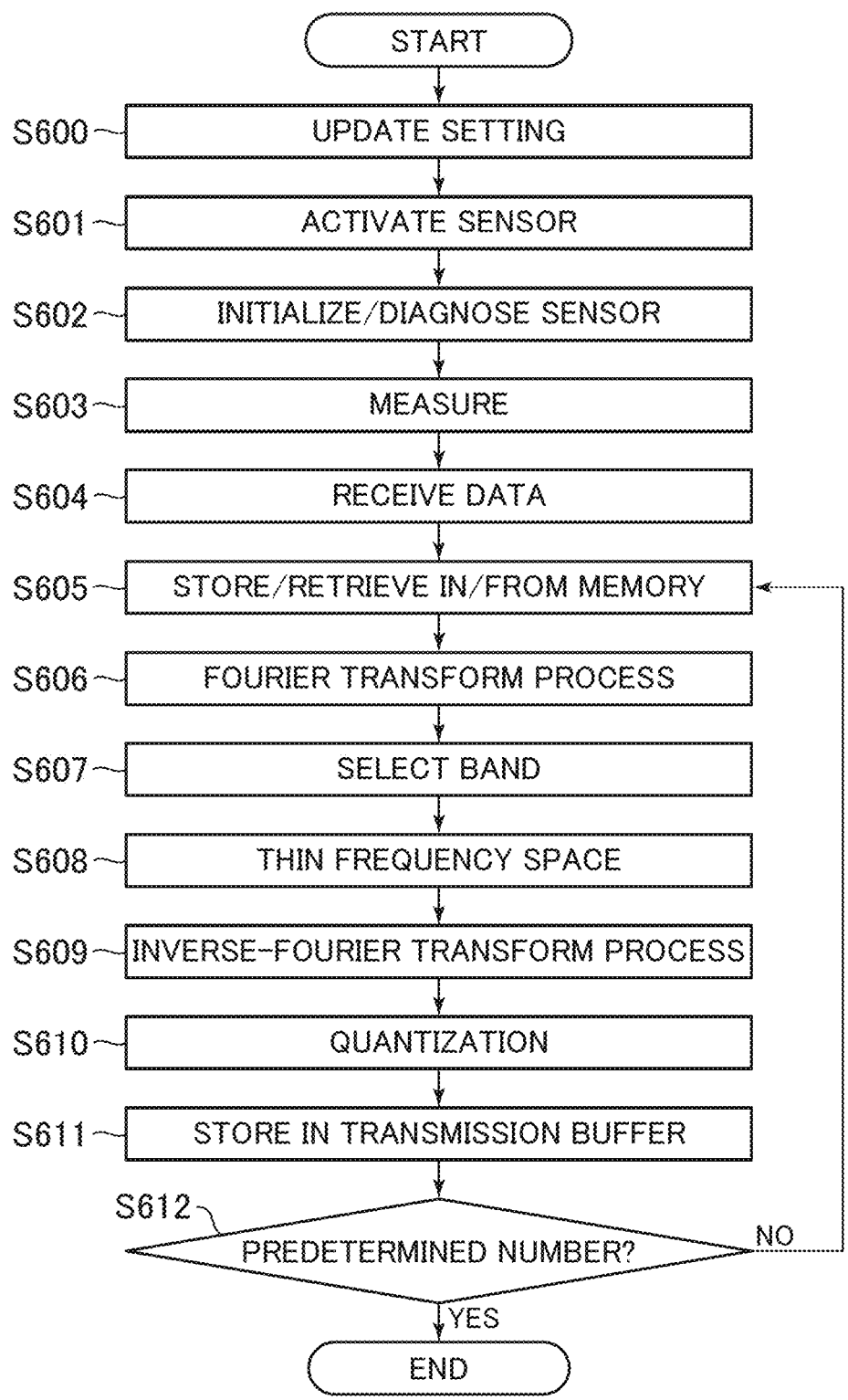
FIG. 6 is a block diagram illustrating a signal process performed in the sensor terminals, according to the first embodiment.

The setting information 2202 is used for setting in a data process in the sensor terminal 107 and a measurement process in the sensor terminal 515. The setting information 2202 includes, for example, a sensor activation cycle, the number of data items to be acquired, a sampling frequency (or sampling cycle), the measurement time or measurement interval of the sensor element 515, the number of data items to be Fourier-transformed, band selection information, thinning information of frequency space, and the number of quantization bits. The setting information 2202 may be a part or the entire of the above information items, or may include any other information regarding the setting of the sensor terminal 107. The sensor terminal 107 performs data processing or measurement in the sensor element 515, as illustrated in FIG. 6, based on the setting information 2202. The contents of the setting information 2202 can be updated, as illustrated in S2101 to S2103 of FIG. 21 and S600 of FIG. 6. The contents of the setting information 2202 may be the same or different between the sensor terminals.

FIG. 23 is a diagram illustrating a configuration of system management information 2300. The calculator 100 stores information corresponding to the sensor terminal management information 2200 of the sensor terminals 107 in the data storage 502 as the system management information 2300. The system management information 2300 is management information including a terminal ID 2301 as identification information uniquely identifying the sensor terminals 107, setting information 2302 regarding the sensor terminals 107, installation positions 2303 of the sensor terminals 107, and an averaging time (period) or averaging data, in association with the sensor terminals.

The terminal ID 2301 may be the same information as the terminal ID 2201 of the sensor terminal management information 2200 that a corresponding sensor terminal 107 has. Similarly, the setting information 2302 may be the same information as the setting information 2202 of the sensor terminal management information 2200 that the corresponding sensor terminal 107 has, after execution of S2102, S2103, and S600.

The installation position 2303 is data regarding the installation position of the corresponding sensor terminal 107 based on the GPS, and may be input by, for example, the installer or manager, when the sensor terminal 107 is installed. When the sensor terminal 107 itself has a GPS function, the sensor terminal 107 may transmit positional data to the calculator 100, and then the calculator 100 may record the positional data for the installation position 2302.

The averaging time 2304 is data for use in a signal process (FIG. 11 or FIG. 12) of the calculator 100, and will more specifically be described later. The averaging time 2304 may be called an averaging period, or may be referred to as the number of averaging data items. The averaging time 2304 may differ between the sensor terminals 107, or may be a common value in the monitoring system.

FIG. 24 is a diagram illustrating a configuration of the pair list 2400. The calculator 100 records the pair list 2400 in the data storage 502. The pair list 2400 records adjacent sensor terminals as a terminal pair, in association with terminal IDs of the sensor terminals. For example, in the example illustrated in FIG. 24, the terminal ID 0001 and the terminal ID 0002 are stored in a manner corresponding to each other, as one terminal pair, in row 2401. This implies that the sensor terminal of the terminal ID 0001 and the sensor terminal of the terminal ID 0002 are adjacent to each other. In any other rows (for example, 2402), information regarding other terminal pairs are recorded. The pair list 2400 is information for use in correlation analysis for measurement data of adjacent sensor terminals (terminal pair) in the signal processing of FIG. 12, and will specifically be described later.

Figure 21:
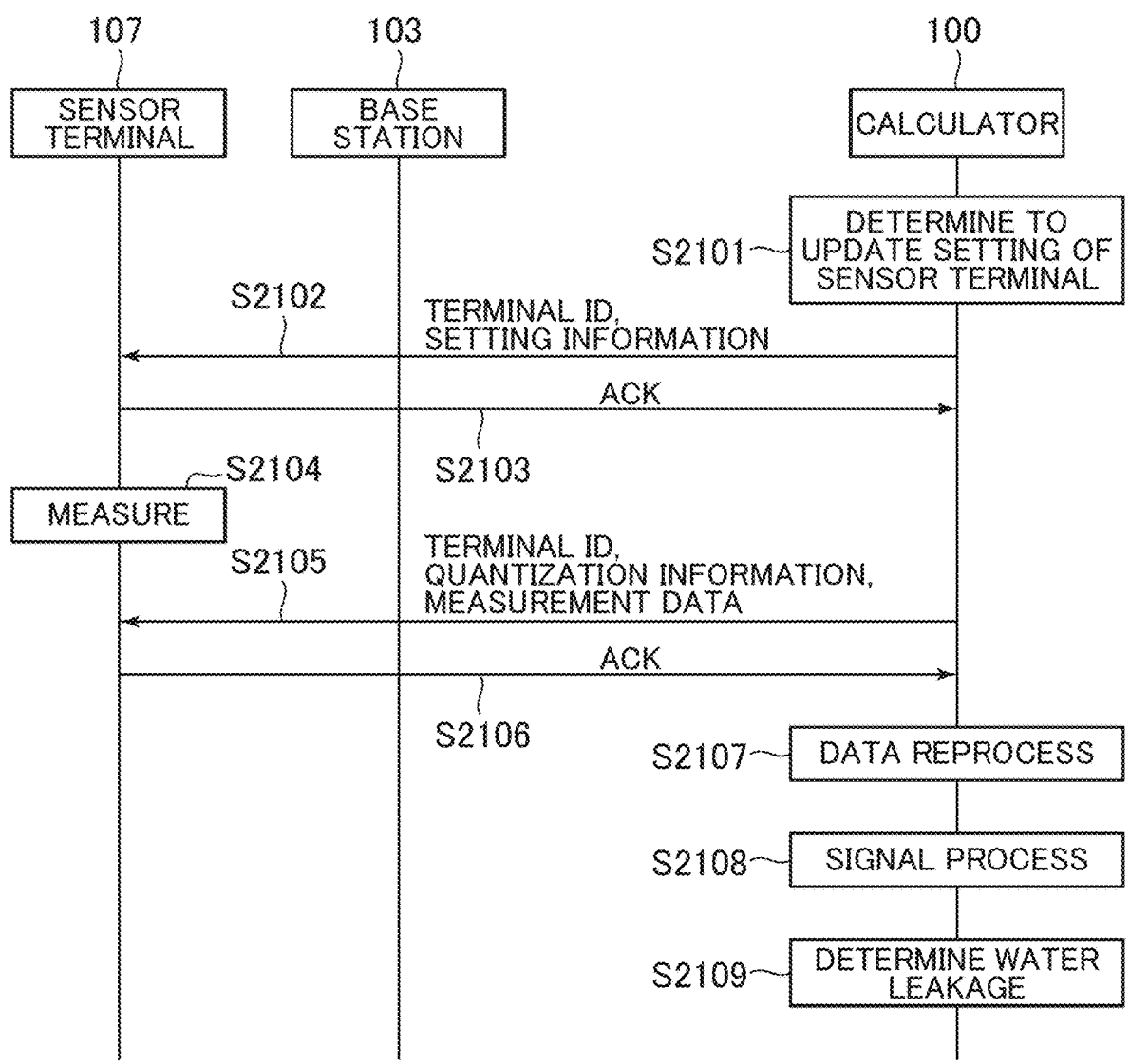
FIG. 21 is a sequence diagram illustrating an operation example in a monitoring system.

FIG. 21 is a sequence diagram illustrating an example of an operation in the monitoring system. This operation is executed at a predetermined timing, during operation of the monitoring system. In this case, the predetermined timing may be a regular timing, for example, once a day, or may be an irregular timing as a trigger in response to an instruction by the manager of the monitoring system. The timings of executing the flows may be predetermined timings.

In a flow S2101, the system control unit 506 of the calculator 100 determines to update the setting for a part or the entire of the sensor terminal 107. For example, when an instruction for updating the setting of a part or the entire of the sensor terminal 107 is received from the manager of the monitoring system, through the input device of the calculator 100, it is possible to determine to update the setting of the sensor terminal 107. For example, based on previous measurement data in the sensor terminal 107 in the monitoring system, new setting may be automatically introduced, and it is possible to determine to update the setting of the sensor terminal 107. In this manner, it is possible to automatically or manually determine to update the setting of the sensor terminal 107. The setting contents of the sensor terminal 107 to be updated are a part or the entire of the information in the setting information 2202 of the sensor terminal management information 2200.

When there is no update of setting of the sensor terminal 107, there is no need to execute S2101, S2102, and S2103. In this case, the sensor terminal 107 executes the process of S2104, with the previous setting information 2204 as is. Because S2102 and S2103 are not executed, it is possible to suppress the battery consumption of the power source 516 of the sensor terminal 107 and to reduce the load on the network.

In a flow S2102, the system control unit 506 of the calculator 100 transmits the terminal ID 903 as identification information for uniquely identifying a target sensor terminal 107 to be updated and setting information 904 to be updated, through the base station1 103, to the target sensor terminal 107 to be updated. An example of a packet configuration of this downlink communication will specifically be described using FIG. 9B.

In a flow S2103, the communication control unit 512 of the target sensor terminal 107 to be updated transmits an ACK (acknowledgement) to the calculator 100 through the base station 103, after the packet transmitted in S2102 is transmitted. Upon reception of this ACK, the calculator 100 identifies that communication with the corresponding sensor terminal 107 is normally performed, and identifies that the setting is updated by this corresponding sensor terminal 107.

As will be described in S600 of FIG. 6, the arithmetic unit 519 of the sensor terminal 107 updates the setting information 2202 of the sensor terminal management information 2200, and updates the setting of the sensor terminal 107, based on the setting information 904 received in S2102. The setting information 904 transmitted in S2102 may include the entire information of the setting information 2202, or may include only information of the setting information 2202 which can be updated. The setting information 904 includes, for example, a sensor activation cycle, the number of data items to be acquired, a sampling frequency (or sampling cycle), the measurement time or measurement interval of the sensor element 515, the number of data items to be Fourier-transformed, band selection information, thinning information of frequency space, and the number of quantization bits. The setting information 904 may include a part or the entire of the above-described information, or may include any other information regarding the setting of the sensor terminal 107.

In a flow S2104, the sensor terminal 107 performs measurement, based on the setting information 2202 of the sensor terminal management information 2200. This measurement will more specifically be described later in S601 to S612 of FIG. 6.

In a flow S2105, the communication control 512 of the sensor terminal 107 transmits the terminal ID 900 as identification information for uniquely identifying the sensor terminals 107, quantization information 901, and measurement data 902 to the calculator 100 through the base station 103. An example of a packet configuration of this uplink communication will more specifically be described using FIG. 9A.

In a flow S2106, upon reception of the packet received in S2105, the system control unit 506 of the calculator 100 transmits an ACK (acknowledgment) to the sensor terminal 107 through the base station 103.

In flow S2107, the signal processing unit 505 of the calculator 100 executes data pre-processing. This data pre-processing will more specifically be described later using FIG. 10.

In a flow S2108, the signal processing unit 505 of the calculator 100 executes an averaging process and a signal process including spike noise removal. This signal process will more specifically be described later using FIG. 11 and FIG. 12.

In a flow S2109, the cooperation application 504 of the calculator 100 executes a water leakage determination process. This water leakage determination process will more specifically be described using FIG. 13.

FIG. 21 illustrates an example of an operation in the monitoring system, and various modifications are applicable thereto. The timing or the number of times each flow is executed may appropriately be changed. The modifications are within the scope of the preferred embodiments of the present invention. For example, after the measurement of S2104 is performed for a plurality of number of times by the sensor terminal 107, the measurement data may be transmitted from the sensor terminal 107 to the calculator 100 for a plurality of number of times in S2105.

FIG. 6 is a flowchart illustrating the control and arithmetic operation in the arithmetic unit 519 of the sensor terminal 107 of FIG. 5.

In a flow S600, the arithmetic unit 519 updates the setting information 2202 of the sensor terminal management information 2200, based on the setting information 904 received in S2102, as described above, and updates the setting of the sensor terminal 107, for example, the setting of the data process or setting regarding the measurement.

The setting information 2202 of the sensor terminal management information 2200 can be set by the system control unit 506 of the calculator 100. It is transmitted to the sensor terminal 107 through the base station 103, using the downlink of wireless communication, as illustrated in S2102 of FIG. 21. The transmitted information is stored in the data memory 518 by the sensor control unit 514 of the sensor terminal 107. The same information is stored also in the data storage 502 of the calculator 100, and used for signal processing in the calculator 100, as the system management information 2300.

The timing of the downlink is arbitrary. For example, is it performed at initial setting of the sensor terminal 107, or at a timing (S2105 of FIG. 21) the sensor data (measurement data 902) is transmitted from the sensor terminal 107 to the base station 103. For example, in FIG. 21, after S2105 or S2106, S2102 and S2103 are performed, and measurement may be performed based on the updated data process setting, at a timing of next measurement (S2104) or later. The data process setting S600 does not need to always be performed, and may be performed at a timing required for the setting.

The sensor control unit 514 activates the sensor element 515 in S601, based on a sensor activation cycle updated in S600. To suppress the battery consumption of the power source 516, in this embodiment, the sensor element 515 is normally OFF. In the monitoring system which transmits data through wireless communication, the capacity of the battery mounted on the sensor terminal 107 is restricted. Thus, it is preferred that the sensor terminal 107 is intermittently operated or operated by event-driven. As a result, vibration information from the buried water pipe 113 is not always and continuously acquired, but may be acquired in fragmentary forms with short periods of time.

Upon activation of the sensor terminal 515, the sensor terminal 515 in S602 is initialized and diagnosed in S602. For example, there is a method for receiving and determining the diagnosis based on a result of a diagnosis program incorporated in the sensor terminal 515. Alternatively, a determination may possibly be made based on a sensor output right after the activation. In a capacity detection type MEMS (Micro Electro Mechanical System) acceleration sensor, there is a failure mode in which an output indicates an abnormal value due to breakdown of the detection capacitor. Then, the step may include a determination as to whether the sensor terminal 515 is normally operated based on the detection.

In Step S603, the sensor element 515 performs measurement. The sensor control unit 514 refers to the setting information 2202 of the sensor terminal management information 2200, and acquires the setting information regarding the measurement in the sensor element 515, for example, the number of data items to be acquired, a sampling frequency, a measurement time, and a measurement interval. Then, it controls the sensor element 515 to execute the measurement, based on this setting information. Particularly, the sampling frequency is a parameter which is essential for determining the signal process after Fourier transform. When the sensor element 515 is an acceleration sensor, acceleration information applied to the buried water pipe 113 is measured.

The measurement data as a result of measurement performed by the sensor element 515 is received by the sensor control unit 514 in the flow S604, and stored in the data memory 518 in S605. The signal processing unit 513 retrieves the measurement data of the data memory 518, and performs data processing for the measurement data in S606 to S610, using the arithmetic memory 517.

In S606, based on the number of data items to be Fourier-transformed, as acquired by referring to the sensor terminal management information 2200, the signal processing unit 513 performs Fourier transform for the corresponding number of data items included in the measurement data. If FFT (Fast Fourier Transform) is applied to the Fourier transform, the processing load on the signal processing unit 513 is reduced. To apply the FFT, the number of data items to be Fourier-transformed is set to a power of 2. The number of data items to be processed in FFT at one time is determined based on the processing time at one time, in consideration of the sampling frequency. For example, if the sampling frequency is 2 kHz, and the number of FFT data items is 2,048, the measurement data of approximately one second can be Fourier-transformed in one FFT. If the number of data items to be Fourier-transformed, the arithmetic load is increased, and the required arithmetic memory capacity is increased as well. This results in increasing the cost of the parts and increasing the consumption power. Thus, it is necessary to perform the setting appropriately in accordance with a target system to be monitored.

In S607, the signal processing unit 513 selects the band, based on band selection information which has been acquired by referring to the sensor terminal management information 2200. The remaining frequency band is deleted, other than the frequency band necessary based on the FFT result. For example, when sampling is performed at 2 kHz, and the band of 300 to 900 Hz is selected, an operation for deleting 0 to 299 Hz and 901 to 1000 Hz is performed based on the FFT process result. This is set based on some condition, that is, a band unnecessary for water leakage detection or a band in which the environmental noise is remarkably larger than a water leakage signal. In a flow S600, the band selection information can be set by downlink, thereby freely changing the band to be selected by feeding back an analysis result in the calculator 100. By reducing the number of data items, a reduction in a transmission data amount is expectable as well, while keeping the water leakage signal information.

In S608, the signal processing unit 513 performs thinning of the frequency space, based on thinning information of the frequency space which has been acquired by referring to the sensor terminal management information 2200. For example, when sampling is performed at 2 kHz in S607, and the band of 300 to 900 Hz is selected, data of the selected band is retrieved at every 30 Hz, and the remaining data is deleted, thereby reducing the data amount to $1/30$. According to our experiment, it is acknowledged that a water leakage signal spectrum does not have a fine structure. Thus, even if thinning is performed coarsely at intervals of approximately 30 Hz, the water leakage information is not deteriorated in its quality. It is possible to set the condition for thinning the frequency space by the data process setting in the flow S600.

For example, it is assumed that transmission capacity has been determined. For easy descriptions, 1,000 data items can be transmitted at one time. To determine whether water leakage has occurred, 1,000 raw data items for one second can be thinned to 10 data items, and data items for 100 seconds can be transmitted. By averaging the data for 100 seconds, it is possible to determine whether water leakage has occurred at a high SNR. When the water leakage has been found, it is preferred to use data with high information density in the frequency space, in order to determine the position of the water leakage thereafter. Thus, the 1,000 data items for one second are transmitted for one second. In this manner, in the data process setting of the flow S600, it is possible to set the conditions in accordance with the use.

The spectrum having a small data amount until the flow S608 is inverse-Fourier transformed by the signal processing unit 513 in S609. To reduce the load on the arithmetic unit 519 or the arithmetic memory 517, it is preferred to use the IFFT (Inverse Fast Fourier Transform). By performing inverse Fourier transform S609, further data compression is expectable.

For data corresponding to a time series and whose data amount has been reduced by the inverse Fourier transform, the signal processing unit 513 in S610 performs quantization based on the number of quantization bits acquired by referring to the sensor terminal management information 2200. For example, in a case of 4-bit quantization, data is expressed by using effectively the entire four bits. Thus, an arithmetic operation is performed for normalizing the data, and its normalization coefficient at this time is transmitted to the calculator 100 as quantization information 901 thereafter. The normalization or quantization conditions can be performed by the data process setting in the flow S600.

The measurement data and normalization coefficient which are arithmetically obtained until the flow S610 are stored in a transmission buffer in the communication control unit 512 in S611, and transmitted to the base station 103 at a timing of IoT communication (S2105 of FIG. 21).

Those processes from the flow S606 to S611 are performed for the number of data items to be Fourier-transformed, and are repeated until reaching a predetermined number of times which is defined by: (a predetermined number of times)=(the entire number of data items)/(number of items to be Fourier-transformed). This judgement is made in a flow S612. For example, when 20,480 of data items are measured for 10 seconds at 2 kHz, if the number of items for FFT is 2,048, the predetermined number of times is 10, and the loop is repeated 10 times. The defined number of times or the number of items to be Fourier-transformed can be set or changed by the data process setting of the flow S600.

For example, to determine whether the water leakage has occurred, it is preferred to have a large predetermined number of times, that is, a small number of items to be Fourier-transformed. It is possible to transmit data corresponding to a long period of time, though the amount of individual information items is small. By averaging the information items, it is possible to determine whether the water leakage has occurred at a high SNR. If the water leakage is found, it is preferred to lower the defined number of times, in order to determine the position of the water leakage thereafter. By lowering the defined number of times and to increase the number of data items to be Fourier-transformed, the information amount per unit time is increased, thereby improving the calculation accuracy of the correlation analysis and improving the specification accuracy of the water leakage position. In this manner, the conditions can be set in accordance with the use.

When the flow of FIG. 6 ends, the entire data to be transmitted to the base station 103 in the IoT communication at one time is stored in a transmission buffer in the communication control unit 512. For example, if the frequency of communications permitted for each sensor terminal 107 is once a day, the flow of FIG. 6 is performed once a day. Needless to say, the operation cycle can flexibly be designed, depending on the scale of the system or the entire design of the communication network.

According to the above processes, the sensor terminal 107 can transmit selectively information necessary for the following process to the calculator 100, of the data acquired by the sensor terminal 515. Thus, it is possible to compress the amount of data transmission. As a result, it is possible to prevent congestion even if the number of base stations 103 is decreased, and it is possible to save the system cost.

Descriptions will now be made to a time synchronization error of the plurality of sensor terminals 107, using FIG. 7. The sensor terminals 107 respectively have internal clocks, and are operated in accordance with the clocks. A time error of several seconds or longer a day may possibly occur, depending on the accuracy of the parts, between the plurality of sensor terminals 107. For example, to analyze the water leakage position by performing a correlation analysis for the adjacent sensor terminals 107 (hereinafter, described as a sensor terminal A and a sensor terminal B), it is necessary to accurately estimate a delay in the signal reaching time from a water leakage point to each of the sensor terminal A and the sensor terminal B. The time synchronization error has a great effect on this estimation. Thus, the number of items to be FFT processed is determined based on the time error.

Figure 7:
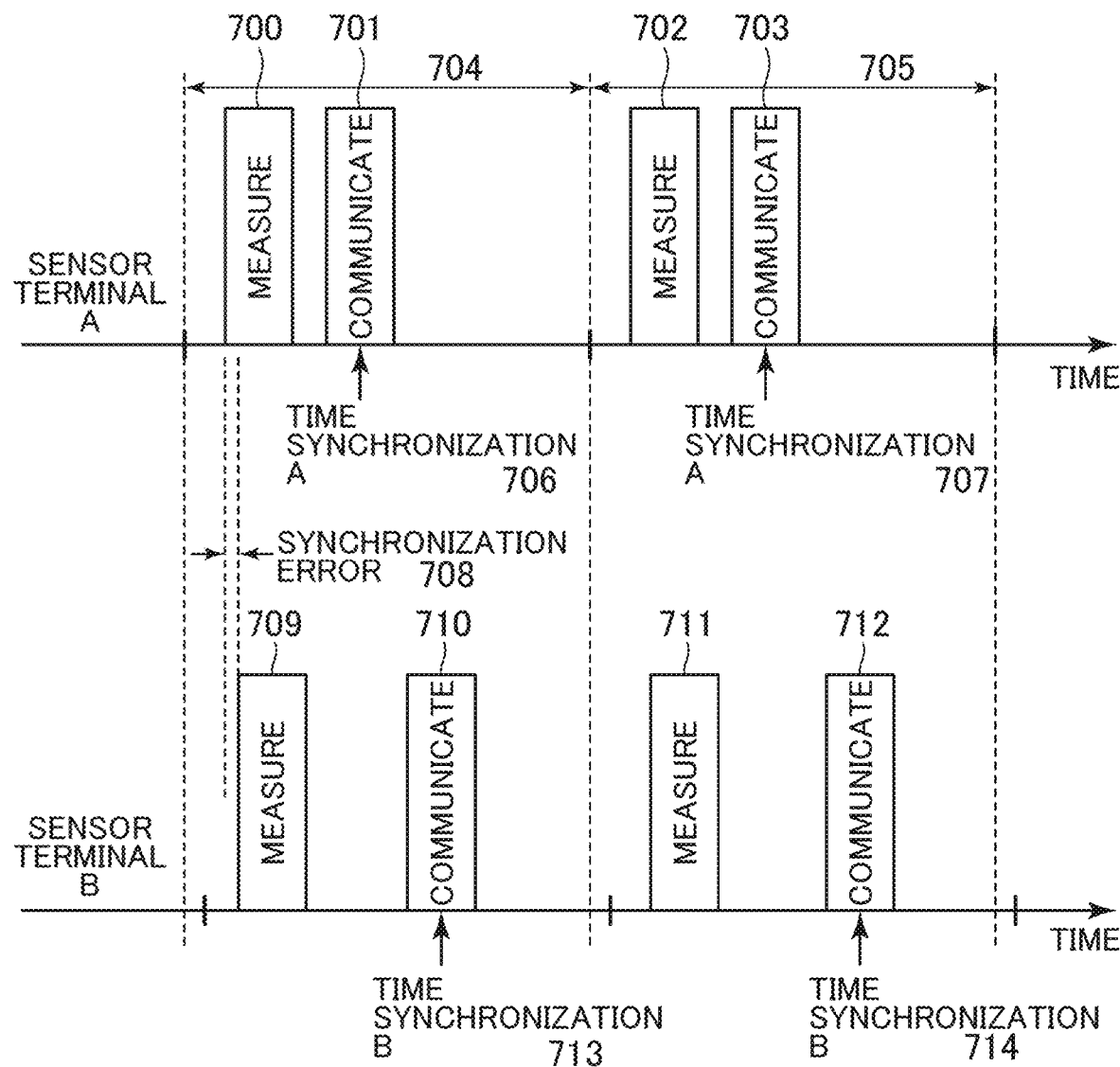
FIG. 7 is a diagram illustrating the overview of a time synchronization error between sensor terminals.

In FIG. 7, "704" and "705" represent 24 hours by referring to the sensor terminal A as a standard. The sensor terminal A performs measurement 700 on the first day, communication 701 on the first day, measurement 702 on the second day, and communication 703 on the second day, based on its own timer. Similarly, the sensor terminal B performs measurement 709 on the first day, communication 710 on the first day, measurement 711 on the second day, and communication 712 on the second day, based on its own timer. Each of the sensor terminals A and B performs time synchronizations 706, 707, 713, and 714 with the system at the timing of communication. However, the sensor terminals A and B perform communications at different times, thus resulting in generating a certain synchronization error 708.

When the sensor terminals A and B measure a water leakage signal at the same water leakage point in a state where the synchronization error 708 has occurred, each of the FFT result of the sensor terminal A and the FFT result of the sensor terminal B may not at all include a water leakage signal due to the water leakage occurred at the same time. For example, when the measurement time is ten seconds, and the time synchronization error is greater than that, no correlation analysis is performed between the sensor terminals A and B. Thus, the measurement time is preferably twice or greater than the time synchronization error. This enables that at least half or more of data can be assumed as measurement data at the same time. Correction of the synchronization error may be performed by the calculator 100. In an example of specifying the measurement time in consideration of the synchronization error, two times or more of the synchronization error in the system specifications is assumed as the measurement time, and an instruction may be given to the sensor terminals 107 in the downlink in the flow S2102. In consideration of reduction in the data amount, approximately two times or three times of the synchronization error is preferred.

Figure 8:
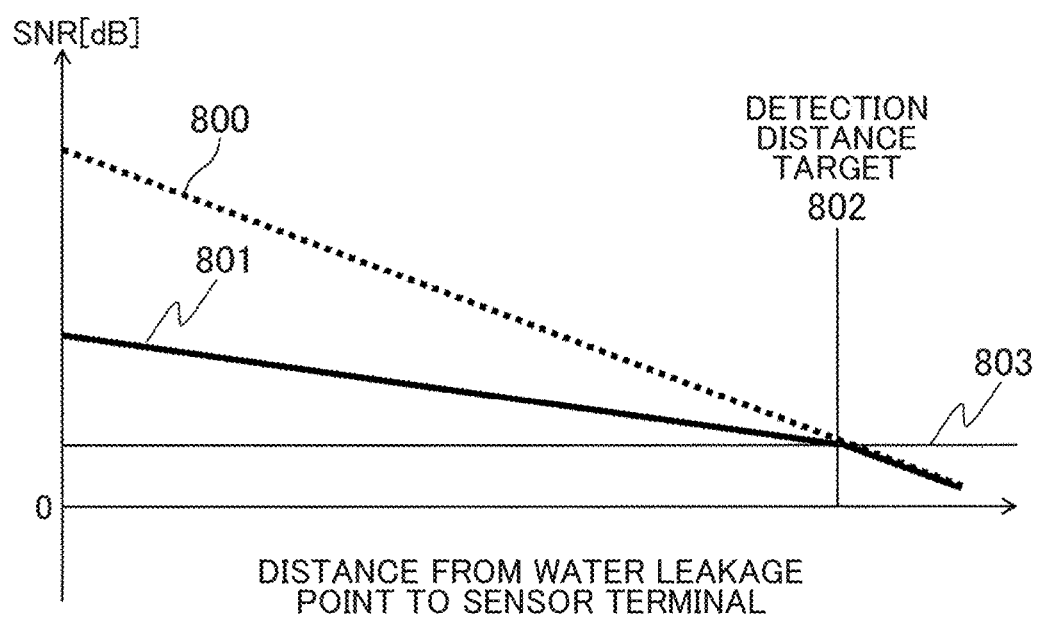
FIG. 8 is a diagram illustrating a graph representing the effect of quantization.

FIG. 8 illustrates an effect on a detection distance, when the information amount is quantized and reduced. The horizontal axis represents the distance to the sensor terminal 107 using the water leakage point "0", while the vertical axis represents a signal noise ratio SNR. A comparison is made between SNRs of multi-bit data 800 in quantization of data by a relatively large number of bits and few-bit data 801 in quantization of data by a relatively small number of bits. The distance of the horizontal axis is matched with the attenuation of the SNR in a manner that it is linearly shown on the graph.

When data quantization is performed with fewer bits, there is a large decreasing rate of the SNR in a region of high SNR, while there is only a little effect in a region of low SNR. When there is a short distance between the water leakage point and the sensor terminal 107, the SNR is decreased in the few-bit data 801 which has been quantized to few bits, as compared with the multi-bit data 800, because the signal intensity is high. On the contrary, as there is a long distance between the water leakage point and the sensor terminal, the signal intensity becomes low, thereby lowering the deterioration of the SNR as a result of quantization to few bits.

When the monitoring system (water leakage detection system) is designed in matching with a detection distance target 802, a requirement specification SNR 803 required for the system can be satisfied even if quantization is performed into few bits, in a region equal to or lower than the detection distance target 802. The number of quantization bits is set based on the target detection distance of the system and the SNR necessary for detection.

FIG. 9A illustrates a configuration example of an uplink communication packet to be transmitted from the sensor terminal 107 to the calculator 100 through the base station 103. FIG. 9B illustrates a configuration example of a downlink communication packet to be transmitted from the calculator 100 to the sensor terminal 107 through the base station 103.

As illustrated in FIG. 9A, the terminal ID 900 is first arranged in the uplink communication, the quantization information 901 at the time of quantization is arranged, and then the measurement data 902 is arranged. The quantization information 901 is a parameter used for quantization in the process S610 of FIG. 6, and is, for example, a normalization coefficient. The measurement data 902 is data stored in a transmission buffer in the process S611 of FIG. 6. The quantization information 901 and the measurement data 902 may be replaced with each other. If the quantization information is transmitted, the calculator 100 can compare the signal intensities of the plurality of sensor terminals 107. It is possible to affix setting information 904 at the measurement in the sensor terminal 107 to the terminal ID information part, and to transmit it. As a result of this, due to a failure in the downlink, if setting of the sensor terminal 107 cannot be updated, there is an advantage that the above failure can be detected by the calculator 100.

As illustrated in FIG. 9B, in the downlink communication, the terminal ID 903 is first arranged, and then the setting information 904 is arranged. The setting information 904 is to be transmitted from the calculator 100 to the sensor terminal 107 in the process S2102 of FIG. 21. If a flag defining whether the setting information 904 is first updated is arranged, even when the setting information 904 is not correctly transmitted due to a communication trouble, only the flag is transmitted. On the contrary, if there is no change therein, an advantage is that no trouble is generated in the sensor terminal 107.

Figure 10:
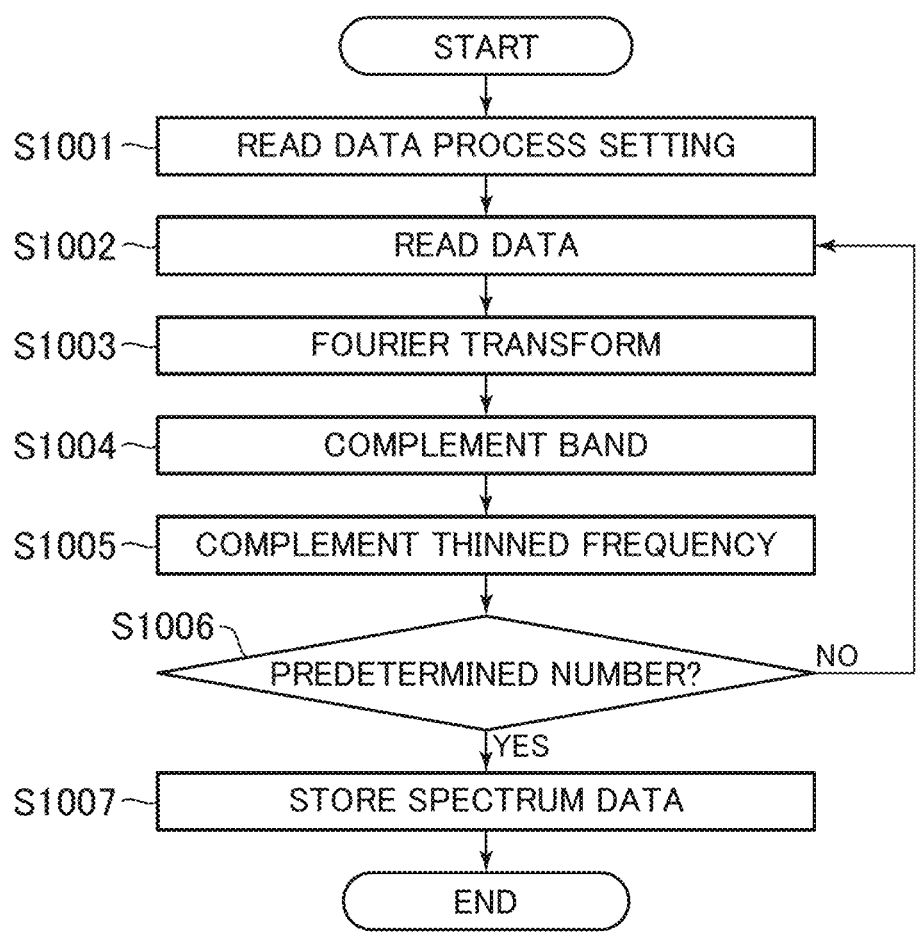
FIG. 10 is a flowchart illustrating a signal pre-process on the cloud side, according to the first embodiment.

FIG. 10 illustrates a flow of a data pre-process in the calculator 100. This process is executed by the signal processing unit 505 of the calculator 100. In this embodiment, the process by the signal processing unit 505 is realized by the processing device of the server executing the program stored in the memory device.

First in S1001, the signal processing unit 505 reads the setting information 902 or averaging time 2304 of the system management information 2300 in association with the sensor terminals 107, from the data storage 502. The setting information 2302 includes the same contents as the information sent to the sensor terminals 107, as the setting information 904 in FIG. 9B. It includes, in the sensor terminal 107, for example, the number of data items to be acquired, the number of data items to be Fourier-transformed, band selection information, thinning information of frequency space, the number of quantization bits, a sensor activation cycle, a sampling frequency, a measurement time, and a measurement interval. The setting information 2302 is arranged in the data storage 502 in association with the terminal ID 2301, thereby easily reading it at the time of data processing.

In a flow S1002, the signal processing unit 505 reads data corresponding to one Fourier transform process in the sensor terminal 107.

In a flow S1003, the signal processing unit 505 restores data before normalization performed in S610, based on the normalization coefficient of the quantization information 901 included in the packet received in S2105. This enables to compare the signal intensities between the plurality of sensor terminals 107. Because this data corresponds to the time series after inverse-Fourier transformed, the signal processing unit 505 performs Fourier transform for the data into data of frequency space. In the Fourier transform at this time, the FFT is preferred.

In a flow S1004, the signal processing unit 505 inserts "0" as the number of data items deleted in the band selection (S607) in the sensor terminal 107.

In a flow S1005, the signal processing unit 505 performs complementation for the number deleted by the thinning (S608) of the frequency space in the sensor terminal 107, with a value estimated from a value in the frequency back and forth. For example, according to an applicable method, when to complement data which has been sampled at 2 kHz and thinned every 30 Hz, of data from 300 Hz to 330 Hz, data of 301 to 315 Hz is complemented with a value of 300 Hz in a range from 301 to 315 Hz, and of data from 316 to 329 Hz, data of 330 Hz is complemented with a value of 330 Hz. Alternatively, according to another applicable method, linear complementation is performed between 300 Hz and 330 Hz. At the end of the flow 1005, the number of data items is the same as the original number of data items to be FFT processed in the sensor terminal 107.

The signal processing unit 505 repeats from the flow S1002 to the flow S1005, until the entire data items of the measurement data in the corresponding sensor terminal 107 are processed (S1006). After the entire data items are processed, the unit 505 stores them in the data storage 502 as complex spectrum data in S1007. For example, when one axis represents a frequency, while the other axis represents the number of repetition of S1006, if a two dimensional matrix is stored, there is formed a data structure suitable for the following signal process.

By the above data pre-processing, the calculator 100 performs complementation for data transmitted from the sensor terminal 107. Then, of measurement data acquired by the sensor terminal 107, it can restore and store information regarding any part necessary for the following process.

Figure 11:
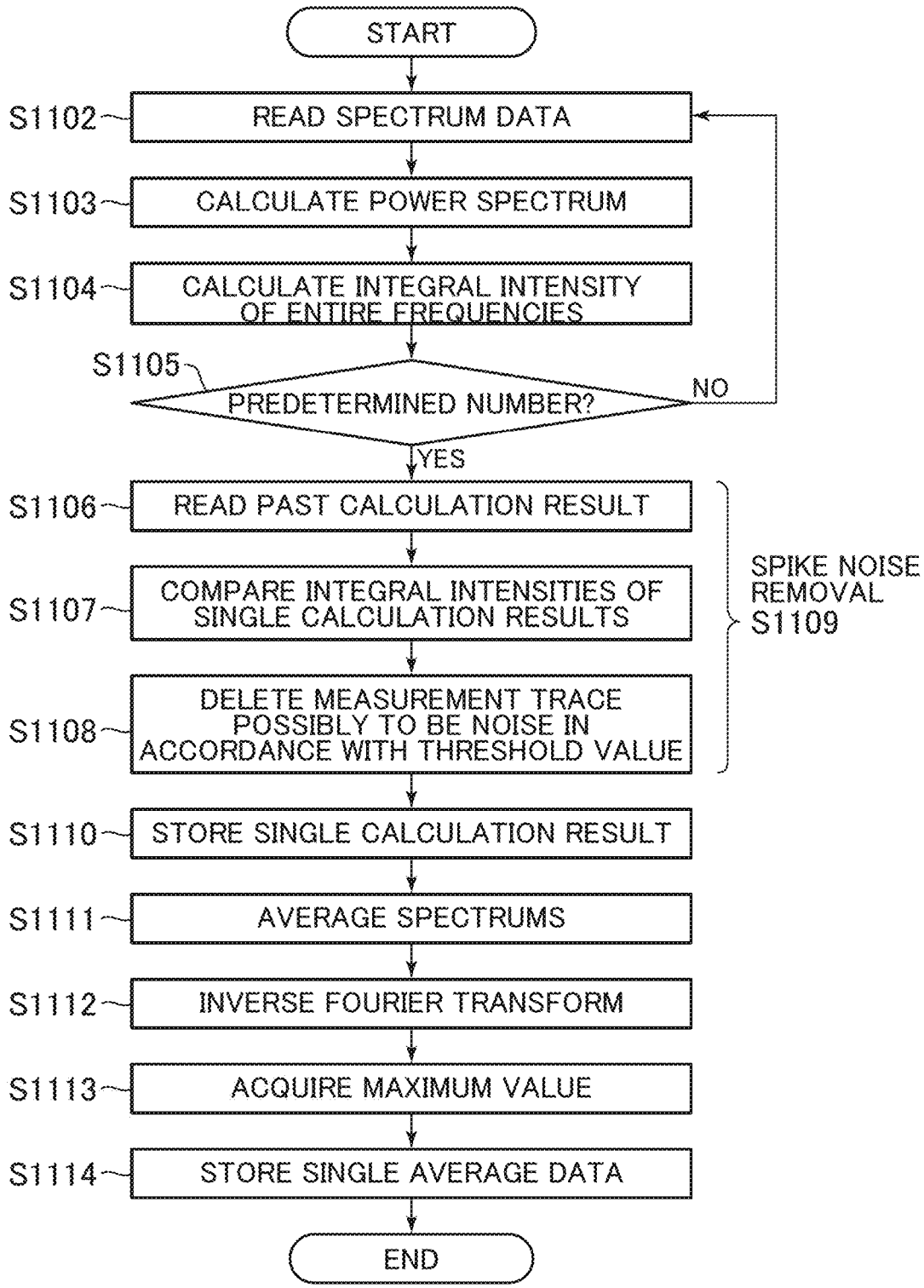
FIG. 11 is a flowchart illustrating a self correlation analysis, according to the first embodiment.

FIG. 11 illustrates a signal process flow for performing an averaging process and spike noise removal, for the complex spectrum data which has been data-reprocessed in FIG. 10. This process is executed by the signal processing unit 505 of the calculator 100.

In a flow S1102, the signal processing unit 505 reads spectrum data corresponding one FFT process in the re-processed data, from the data storage 502. For the spectrum data, in S1103, the signal processing unit 505 performs calculation of a power spectrum(s). Further, in a flow S1104, the signal processing unit 505 obtains the integral intensity (or integrated intensity) in the entire frequencies of the power spectrums. This result is used as a determination value for performing the spike noise removal in following S1109. The calculation of the power spectrums and calculation of the integral intensity are well known, and thus will not be described.

From the flow S1102 until S1104 for the entire complex spectrum data, the signal processing unit 505 executes a loop in S1105. The calculated power spectrum group and the same number of integral intensity values will hereinafter be referred to as "single calculation results". The signal processing unit 505 stores the single calculation results in the data storage 502.

Next, spike noise removal S1109 is executed. Descriptions will now be made to details of the spike noise removal in following S1106 to S1108.

In the flow S1106, the signal processing unit 505 reads the past single calculation results which are determined as system parameters in advance, based on the averaging time 2304 of the system management information 2300, from the data storage 502. It is expectable that the SNR is improved until sixty averaging processes, based on the SNR improvement result illustrated in FIG. 4. For example, when it is assumed that the operation of the sensor terminal 107 is performed once a day, data processing in the calculator 100 is performed at the same frequency. Thus, by accessing the data for the past sixty days and averaging it with data of the corresponding day, it is expectable that the SNR is improved by 10 dB according to a result of FIG. 4, as compared with a case in which only the data of the corresponding day is used. Therefore, in the flow S1106, for example, data for the past sixty days is read out.

In a flow S1107, the signal processing unit 505 compares the integral intensity of the acquired data of the corresponding day and the integral intensity of each of the data items for the past sixty days. If the intensity remarkably deviates from the trend, it is determined as an instantaneous noise. For the calculation of the trend, a well-known technique, such as a linear regression trend, is applicable.

In a flow S1108, the signal processing unit 505 determines a measurement trace which may possibly be a noise based on a threshold value. For example, when the intensity is greater than the threshold value which has been set based on the trend, the signal processing unit 505 determines as an instantaneous noise, and deletes a corresponding data stream. For example, when processing is performed for ten data items for one second each, that is, data for ten seconds as a data amount for a whole day, if the integral intensity at one second is high, the signal processing unit 505 excludes the data for one second from the averaging, and stores the remaining data for nine seconds in the data storage 502, as single calculation results in a flow S1110. Data of the single calculation result is referred as the past calculation result, at the calculation from and after the next day. Not only in the specification of the water leakage position, but also in the determination as to whether water leakage has occurred, it is possible to improve the determination accuracy, by comparing a plurality of sensor information items for a long period of time over a plurality of days.

In an environment where the occurrence of noise is not assumed, it is possible to exclude the spike noise removal S1109. It is possible to perform only of one of the flows S1107 and S1108. It is also possible to add or replace any well-known technique for the spike noise removal, for example, by calculating the time differentiation and detecting the spike noise for performing the filtering.

In the flow S1110, the signal processing unit 505 stores the data after the spike noise removal in S1109 in the data storage 502, as a single calculation result.

When the data for the past sixty days is read in S1106, in S1111, the signal processing unit 505 calculates the power spectrum average of the data of the corresponding day and the data of the past sixty days, and obtains one power spectrum as an averaging power spectrum based on the data of the past including the corresponding day. The user can arbitrarily set the averaging time (period) or the number of averaging data items.

In S1112, the signal processing unit 505 performs inverse-Fourier transform for the power spectrum which has been obtained in S111, calculates a self-correlation function, and further acquires the maximum value in S1113. The signal processing unit 505 stores the maximum value of this self-correlation function in the data storage 502, as signal average data of this corresponding day. As a result, it is possible to acquire data for determining the water leakage with less effect of a spike noise or noise, using data of a single sensor terminal 107.

Figure 12:
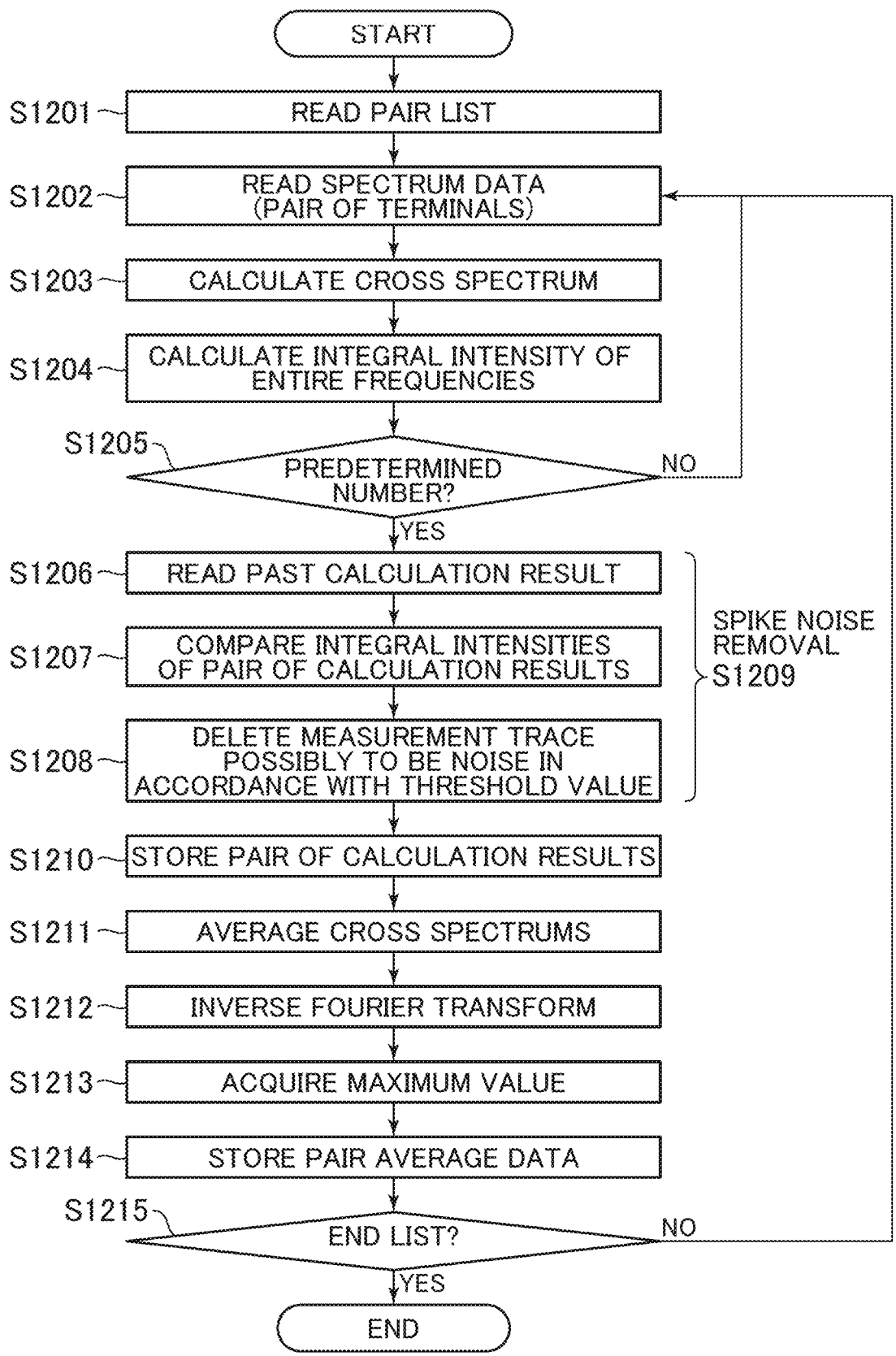
FIG. 12 is a flowchart illustrating a mutual correlation analysis, according to the first embodiment.

FIG. 12 illustrates a signal process flow, when to perform a correlation analysis using measurement data of two adjacent sensor terminals 107. This process is executed by the signal processing unit 505 of the calculator 100. Unlike a case in which the measurement data of the single sensor terminal 107 of FIG. 11 is used, a pair list 2400 of sensor terminals 107 performing a correlation analysis is supplied from an upper system.

In a flow S1201, the signal processing unit 505 reads the pair list 2400 from the data storage 502. In a flow S1202, the signal processing unit 505 refers to the system management information 2300, and reads out the setting information 2302 or the averaging time 2304 of two adjacent sensor terminals 107 as a terminal pair, from the data storage 502, based on the pair list 2400.

In FIG. 11, the power spectrum has been calculated. On the other hand, in the correlation analysis of FIG. 12, the signal processing unit 505 calculates a cross spectrum between the two sensor terminals 107 in a flow S1203, and stores a calculation result for the terminal pair of the sensor terminal 107 in a flow S1210. The same processes as the flow S1104 to S1109 of FIG. 11 are performed in an entire frequency integral intensity calculation 1204, predetermined number determination S1205, and spike noise removal S1209 including a flow S1206 to a flow S1208. Those targets to be processed are data of the terminal pair.

In a flow S1210, the signal processing unit 505 stores data after spike noise removal in S1209 in the data storage 502 as a result of pair calculation.

In a flow S1211, the signal processing unit 505 calculates an average of cross spectrums of data of a corresponding day and the past data, based on the averaging time (period) or the number of data items, and acquires one cross spectrum as an averaging cross spectrum based on the data of the past including the corresponding day.

In a flow S1212, the signal processing unit 505 performs inverse-Fourier transform for the cross spectrum acquired in S1211, calculates a mutual correlation function, and acquires the maximum value thereof in S1213. The signal processing unit 505 stores the maximum value of this mutual correlation function in the data storage 502, as pair average data of the corresponding day. As a result, it is possible to acquire data for determining the water leakage with less effect of a spike noise or noise, using data of the two adjacent sensor terminals 107.

To perform the correlation analysis exhaustively for a plurality of terminal pairs, the processes from the flow S1202 to S1214 are repeatedly executed, until the processes are completed for the entire terminal pairs in the pair list 2400. The pair list 2400 is updated every time the sensor terminal is moved, and is stored in the data storage 502. Thus, the latest information is always read in S1201.

Further, the pair list 2400 is preferably configured without any pair of not adjacent terminals or any pair of terminals which are provided over the maximum detection distance of the sensor terminals 107, as set by the monitoring system. Even if the buried water pipe 113 is branched, as long as the distance along the branch is within the assumed maximum detection distance, it is possible to detect the terminals as a pair. This enables to accurately estimate whether the water leakage has occurred or the water leakage position, even in a state with the branch.

FIG. 13 is a diagram illustrating a process flow at the time of determining the water leakage. This process is executed by the cooperation application 504 of the calculator 100. The following process is only one example. The determination may be performed in accordance with a technique using another correlation, using the single average data explained in FIG. 11 and the pair average data explained in FIG. 12. By performing the above determination using these average data, it is possible to perform the determination with high accuracy.

Figure 13A:
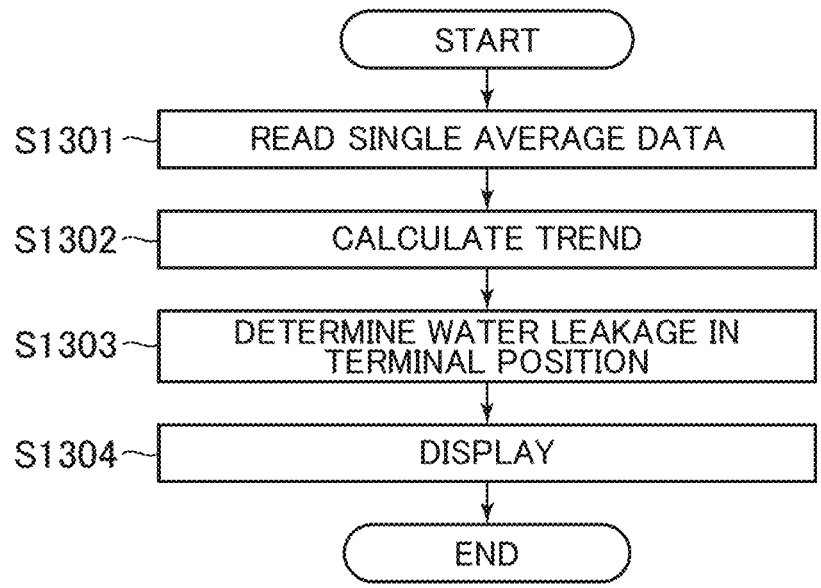
FIG. 13A is a flowchart illustrating the flow of determining water leakage based on the self correlation analysis, according to the first embodiment.

FIG. 13A illustrates the flow of determining the water leakage, using single average data as a result of a self-correlation analysis of a single sensor terminal. First, in F1301, the calculator 100 reads the single average data from the data storage 502.

In S1302, the calculator 100 performs well-known trend calculation, using a result of the past single average data. For example, a linear regression equation can be used for learning the trend pattern, by calculating a linear trend, when there is no water leakage based on the past average data.

In S1303, the calculator 100 detects a phenomenon deviating from the trend using the learned result of the trend pattern or a predetermined threshold value, and determines the water leakage in the installation position 2303 of a corresponding sensor terminal 107.

In S1304, the calculator 100 overlaps the water leakage determination result in the corresponding sensor terminal 107 with a map, based on the installation position 2303 of the sensor terminal 107 and the water leakage determination result, and displays it together on the display unit 503.

Figure 13B:
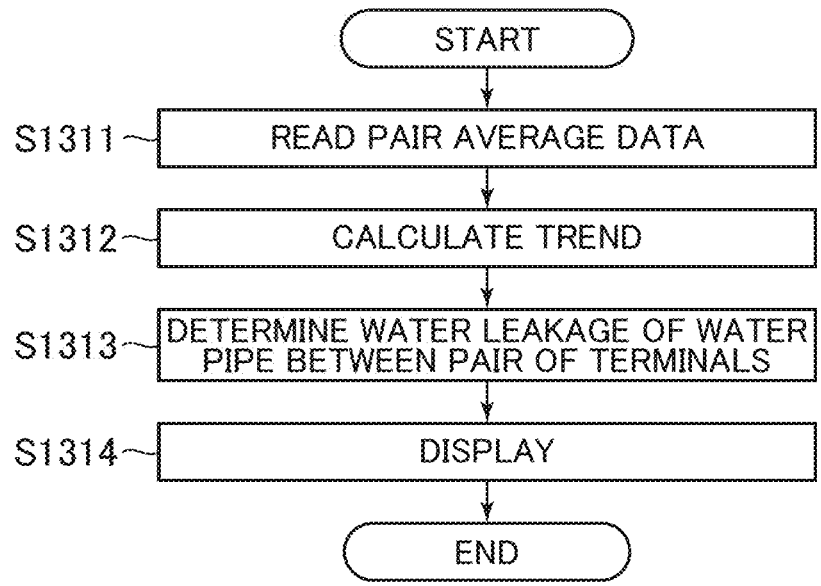
FIG. 13B is a flowchart illustrating the flow of determining water leakage based on the mutual correlation analysis, according to the first embodiment.

FIG. 13B illustrates the flow of determining the water leakage, using the average data based on a mutual correlation analysis. In S1311, the calculator 100 reads the pair average data.

In S1312, the calculator 100 performs the trend calculation, using the result of the past pair average data.

In S1313, the calculator 100 performs water leakage determination of a water pipe between the pair of terminals.

The buried water pipe 113 between the terminals is expressed in the form of a line on the map. Thus, in S1314, the calculator 100 overlaps, for example, a water leakage determination result with a line representing the buried water pipe 113 on the map, based on the installation position 2303 of the pair of sensor terminals 107, the map information, and the water leakage determination result. Then, it displays it together on the display unit 503.

Figure 14A:
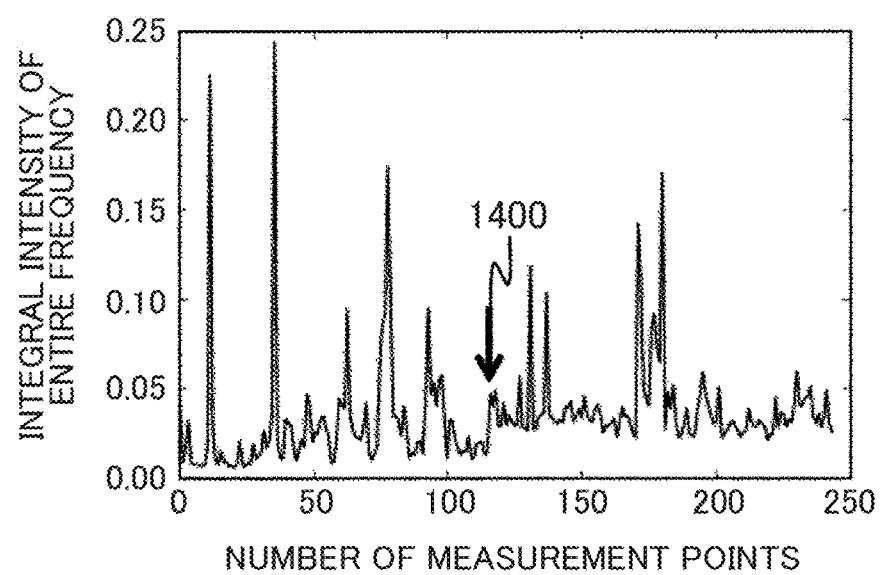
FIG. 14A and FIG. 14B are diagrams each illustrating a comparison graph expressing the entire frequency integration intensities, between a case where spike noise removal is performed and a case where spike noise removal is not performed, according to the first embodiment.
Figure 14B:
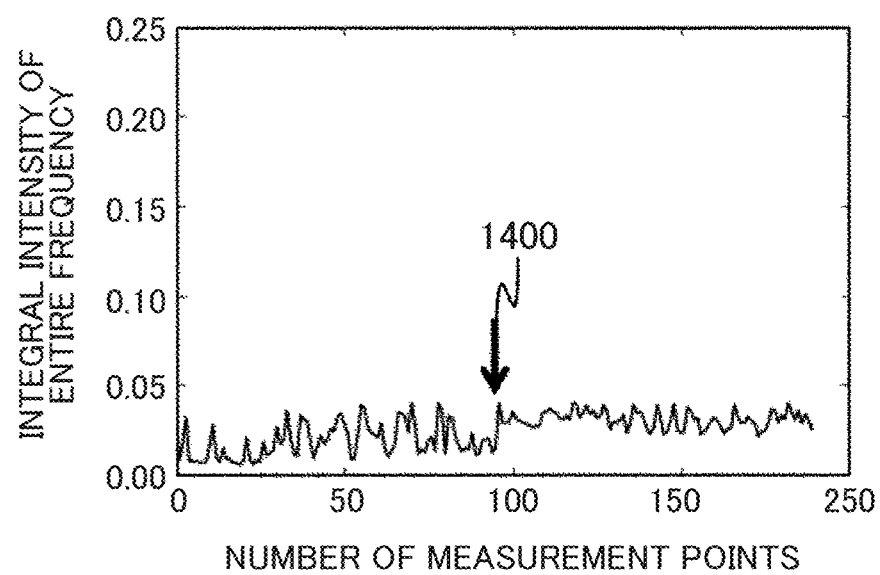

Each of FIG. 14A and FIG. 14B illustrates the entire frequency integral intensities as a result of the flow S1104. FIG. 14A illustrates a graph before the spike noise process of the flow S1109, while FIG. 14B illustrates a graph after the spike noise removal. The reason why the number of measurement points of FIG. 14B is lower than that of FIG. 14A is that the entire frequency integral intensities do not include those high measurement points in a spike-like form. In this manner, removal of the spike noise causes a reduction in the number of data items, but results in an advantage of showing a clear change in the entire frequency integral intensities before and after the occurrence of the water leakage represented by an arrow 1400.

Figure 15A:
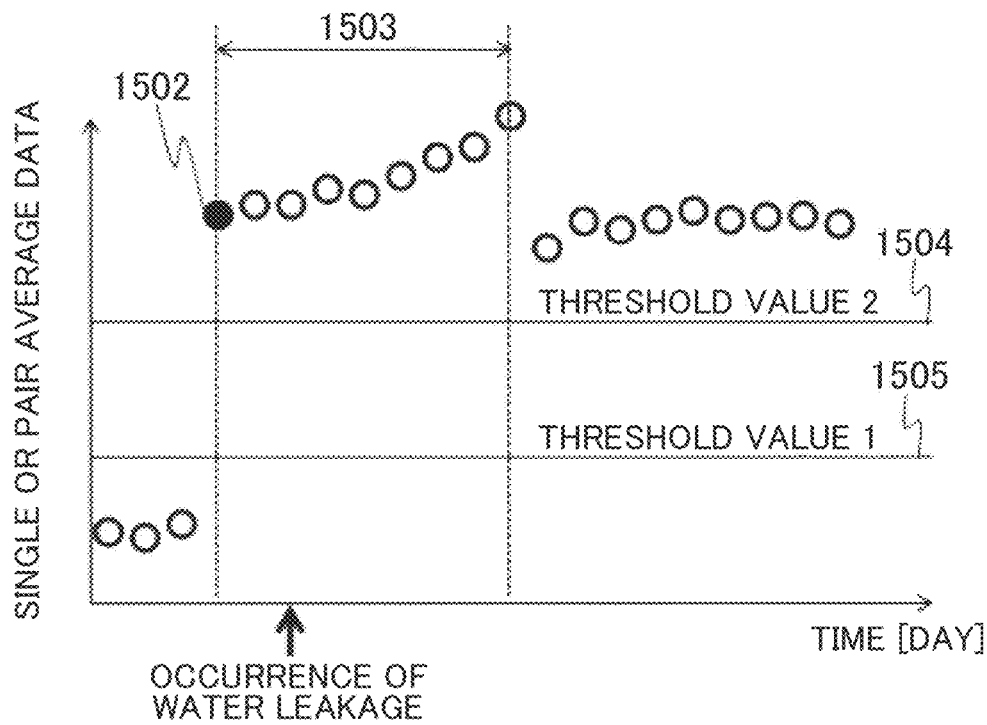
FIG. 15A and FIG. 15B are diagrams each illustrating a comparison graph expressing a trend calculation result, between a case where the spike noise removal is performed and a case where the spike noise removal is not performed, according to the first embodiment.
Figure 15B:
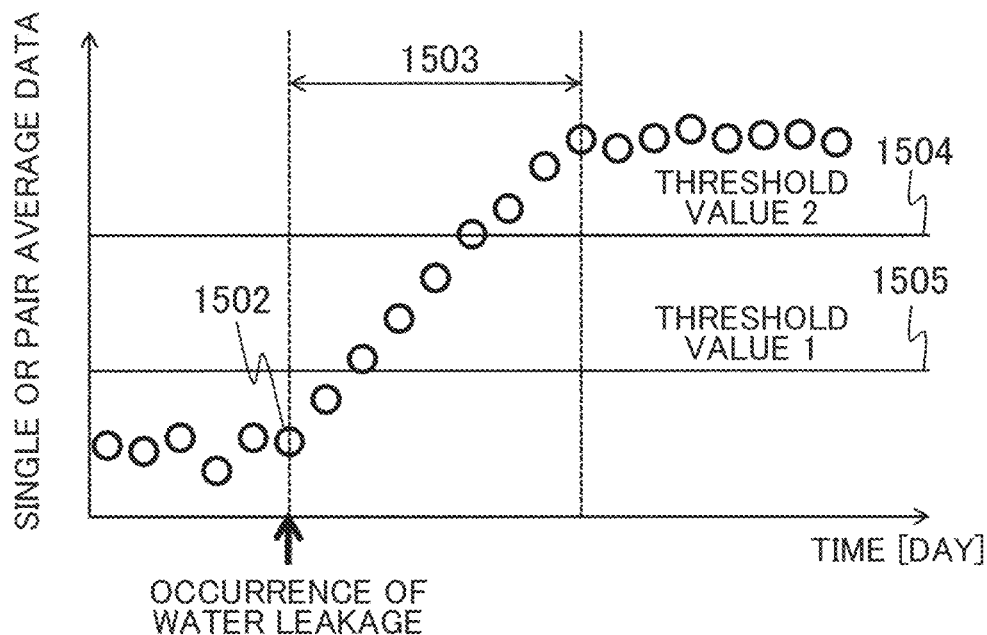

Each of FIG. 15A and FIG. 15B illustrates a trend calculation result. Descriptions will now be made to an effect of a spike noise on the past data and the averaged data, using FIG. 15A and FIG. 15B. The horizontal axis of FIG. 15A and FIG. 15B represents the time, while the vertical axis represents averaged data of a single or a pair of terminals. A threshold value 1 and a threshold value 2 are examples of threshold values acquired as a result of trend calculation. When it is equal to or lower than the threshold value 1, it represents "normal" (no water leakage). When it is equal to or greater than the threshold value 2, it represents "not normal" (water leakage). A value between the threshold value 1 and the threshold value 2, it is considered as "determination holding state". With the two threshold values, it is possible to prevent an error determination as a result of a sudden increase in the average data value.

In FIG. 15A, data 1502 is a point including a spike noise. Data 1503 represents the length of the averaged time. When a signal with a spike-like form is input once, the entire signal levels increase, until the data is out of a range of the averaging time. This increase in the signal level due to this spike noise causes an error determination, at the time of determination using a threshold value 1505 or 1504.

In FIG. 15B, the past trend of the signal is smoothly formed due to removal of the spike noise identified with 1502, thereby facilitating the determination using the threshold value. In the determination using the threshold value 1 and the threshold value 2, the status of "normal" is switched to "determination holding" at the stage where the data exceeds the threshold value 1, and then the status of "determination holding" is switched to "normal" at the stage where it 4exceeds the threshold value 2 (final determination). Because a reference numeral 1503 represents the length of the averaging time, it will be changed to the signal intensity representing the water leakage state equal to or greater than the threshold value 2, with a time width over several days. That is, if the averaging time 1503 gets longer, the SNR is improved. However, it takes a long period of time to detect (final determination) the water leakage. The length of the averaging time (averaging period) or the number of averaging data items is preferably set in accordance with the system, to an extent that the signal intensity and the time delay to the water leakage detection are allowable.

Second Embodiment

Descriptions will now be made to a second embodiment, particularly only to differences of the operation or configuration of the monitoring system described in the first embodiment. Thus, the same operation or configuration as that of the first embodiment will not be described over and over.

Descriptions will now be made to a signal process flow in the sensor terminal 107 in the second embodiment. It is a flowchart of the control and an arithmetic operation in the arithmetic unit 519 of the sensor terminal 107 of FIG. 5. Unlike the flow illustrated in FIG. 6, the inverse-Fourier transform 609 is not performed. That is, in the flow, while maintaining the complex frequency spectrum as is, it is quantized to few bits and transmitted.

When, for example, 2,048 time-series data items are FFT-processed, the frequency spectrum will be 2,048 complex data items. However, half of the data items are the complex conjugate of the other half. Thus, only the half thereof may be transmitted and complemented by the cloud calculator (calculator 100). As a result, the amount of transmission data in data transmission at least in S2105 may be reduced by half.

It is noticeable that both of a real part and an imaginary part are necessarily transmitted in the data transmission of S2105. When only the self-correlation analysis is performed, data may be formed in a power spectrum, and then transmitted. In this case, only the real part is transmitted, thereby enabling to reduce its data amount, as compared with a case where the data amount is transmitted in the complex form. When the correlation analysis between the adjacent sensor terminals is performed, complex spectrum calculation is necessary in the cloud calculator (calculator 100). This results in high efficiency, when the complex frequency spectrum is transmitted as is.

FIG. 17 illustrates an example of a packet configuration in uplink communication from the sensor terminal 107 to the base station 103, in the second embodiment. The uplink communication packet includes the terminal ID 900, measurement data 1702 (or 1705), and quantization information 1703 (or 1706). As described in FIG. 16, to transmit the complex spectrum, the data units 1702 and 1705 are formed from a real part Rx and an imaginary part Ix. The quantization information 1703 and 1706 need to be transmitted, and formed from two parts: a real part RQ and an imaginary part RQ.

Figure 17A:
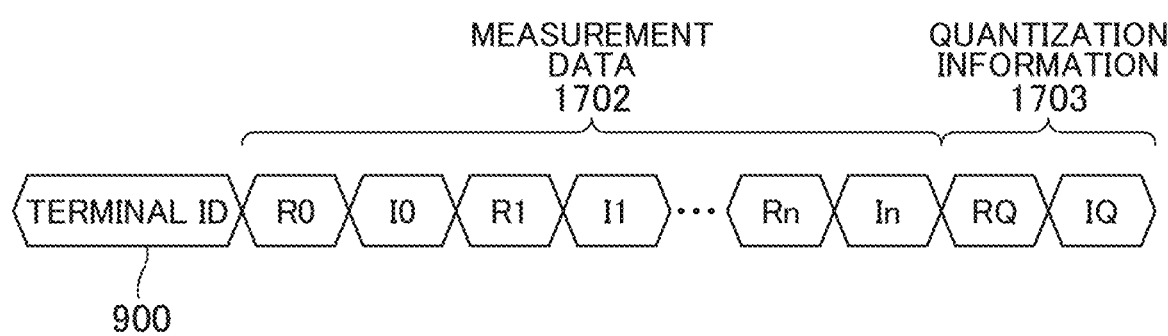
FIG. 17A and FIG. 17B are an image diagram illustrating a configuration example of a communication packet between a sensor terminal and a base station, according to the second embodiment.
Figure 17B:
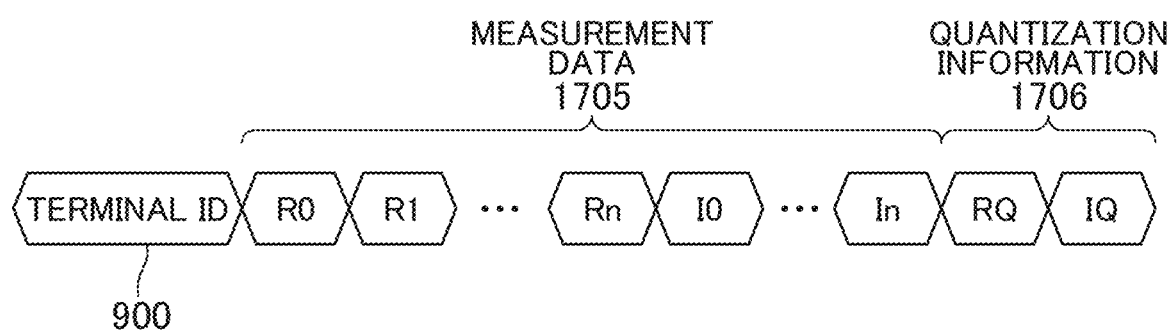

FIG. 17A illustrates an example of a case in which the measurement data 1702 is arranged in the order of data stream, and are transmitted in the order from a real part, an imaging part, a real part, an imaginary part, . . . . FIG. 17B illustrates an example in which only a set of real parts and only a set of imaginary parts of the measurement data 1705 are transmitted in the order of data points. In consideration of a risk that the data is garbled due to a communication failure, the number of data items to be effected thereby may possibly be suppressed to the half of that of FIG. 17B according to the technique of FIG. 17A, which is thus more preferable. On the other hand, according to the technique of FIG. 17B, the calculator 100 on the reception side can possibly and easily receive data. Selection of the packet pattern may flexibly be changed in accordance with the system design.

In the second embodiment, FIG. 18 illustrates a flow of a data re-process in the calculator 100. This process is executed by the signal processing unit 505 of the calculator 100. Unlike the data re-process in the first embodiment illustrated in FIG. 10, the Fourier-transform process S1003 is not performed. The reason why the Fourier transform is not necessary is that the measurement data transmitted from the sensor terminal 107 is complex spectrum data. As a result, the load on the calculator 100 can be reduced, thereby contributing to a reduction in the consumption power of the calculator 100.

Third Embodiment

In a third embodiment, descriptions will now be made only to those differences of the operation or configuration of the monitoring system from those described in the first embodiment. Those same operation or configuration as those of the first embodiment will not be described over and over.

Figure 19:
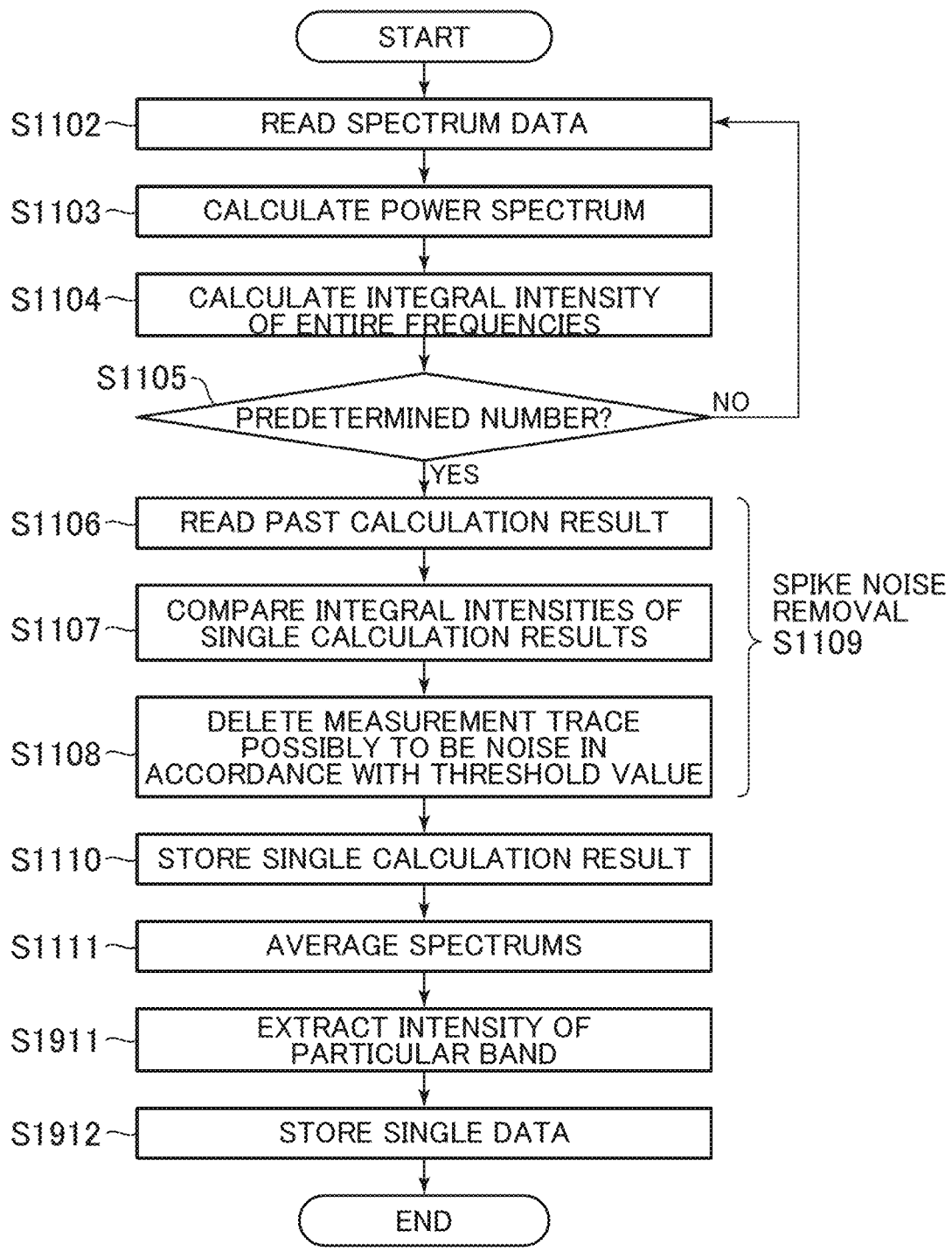
FIG. 19 is a flowchart illustrating a self correlation analysis, according to a third embodiment.

FIG. 19 illustrates another example of a signal process flow of a self-correlation analysis in the calculator 100. This process is executed by the signal processing unit 505 of the calculator 100. As compared with the process of FIG. 11, those processes from S1102 to S1111 until the averaging of the spectrums are the same, but those processes S1911 and S1912 thereafter are different. That is, as compared with the first embodiment illustrated in FIG. 11, in the flow S1911, the intensity of the power spectrum is extracted and integrated, in a particular band. Further, in the flow S1912, unlike the first embodiment, this value is stored as single data. Because the self-correlation functioning is not necessary, the inverse-Fourier transform is not necessary as well, thus reducing the load on the cloud calculator (calculator 100). Because the processes are performed in the particular band, the SNR can possibly be improved. To set the particular band, it is possible to use a structure analysis result of the buried water supply network or a calculation result of a water pressure distribution by a pipe network simulator.

Figure 20:
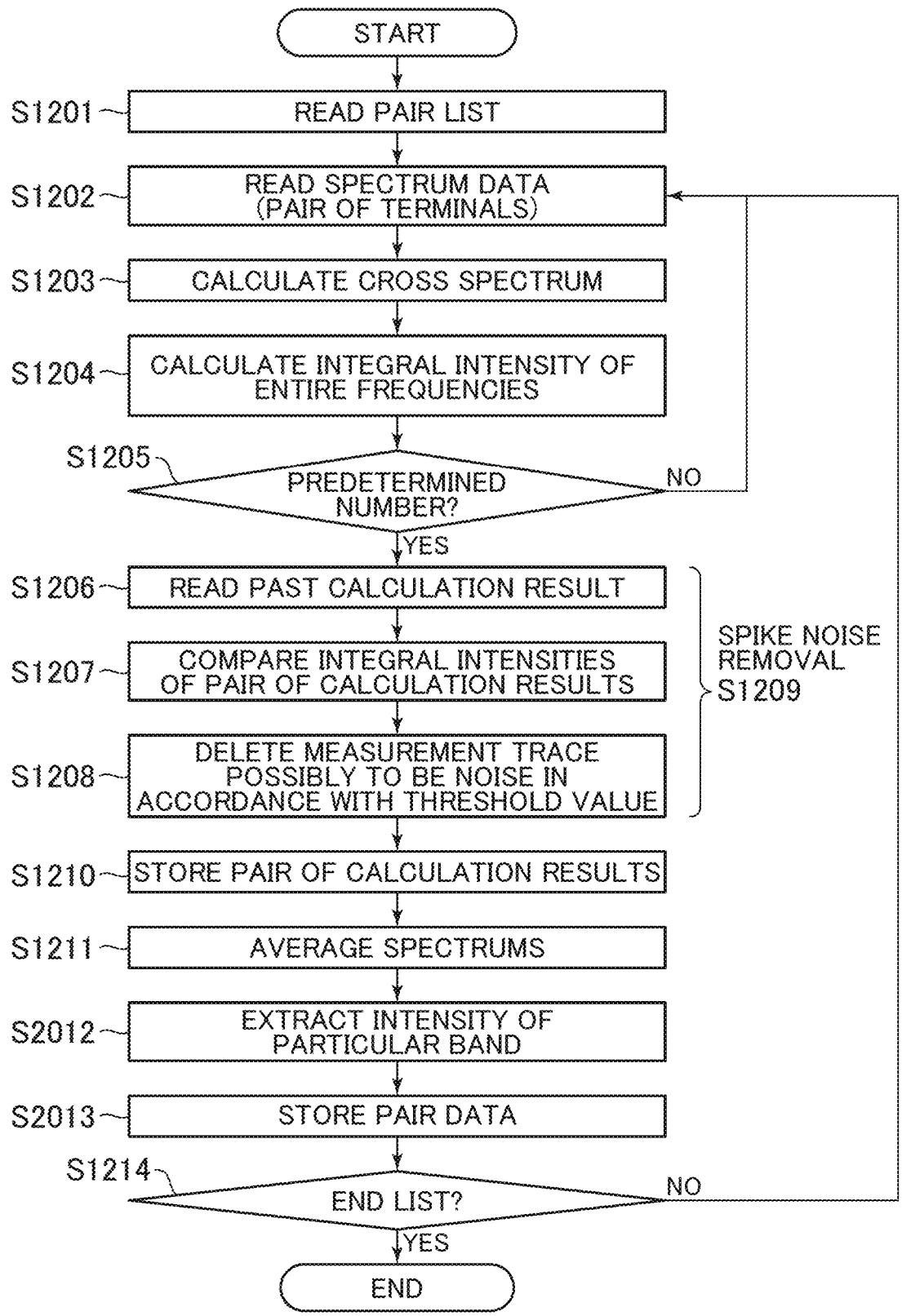
FIG. 20 is a flowchart illustrating a mutual correlation analysis, according to the third embodiment.

FIG. 20 illustrates another example of a signal process flow of a mutual correlation analysis in the cloud calculator (calculator 100), in the third embodiment. This process is executed by the signal processing unit 505 of the calculator 100. Those processes from S1201 to S1222 until the averaging of the spectrums are the same as those of the first embodiment illustrated in FIG. 12, but those processes S1911 and S1912 thereafter are different. In a flow S2012, the intensity of the cross spectrum is extracted and integrated, in a particular band. Unlike the above, in a flow S2013, the values are stored as a pair of data items. It is possible to reduce the load on the cloud calculator (calculator 100) by analyzing the mutual correlation spectrum, without performing the inverse-Fourier transform and without calculating the mutual correlation function. The SNR can possibly be improved by performing the process, in a particular band. Like the case of the self-correlation analysis, to set the particular band, it is possible to use a structure analysis result of the buried water supply pipe network or a calculation result of a water pressure distribution by a pipe network simulator.

Accordingly, the inventions by the present inventors have specifically been described based on the preferred embodiments. However, the present invention is not limited to the preferred embodiments, and various changes are possible without departing from the scope thereof. A preferred embodiment may be combined with any of constituent elements of any other embodiment.

Of the inventions disclosed in the embodiments of the present application, the effects acquired by any typical invention will briefly be described as follows. That is, in a system which quickly detects and repairs any abnormality by monitoring the buried pipe infrastructure, it is possible to improve the determination accuracy of water leakage by performing an averaging process for information in fragmentary and incomplete forms regarding the buried pipe, as acquired by the sensor terminal, for a long period of time over a predetermined number of days. It is possible to extend the range to be monitored by a single sensor terminal without increasing the cost of parts included in the configuration of the hardware of the sensor terminal. Therefore, the number of sensor terminals to be installed can be reduced, thus decreasing the cost of the entire system. Further, data transmission is possible using an IoT communication network with a limited amount of data communication, thereby decreasing the communication cost of the system.

The following configurations are included in the technical scope of the present invention.

A monitoring system includes a plurality of sensor terminals which are installed for a target object to be measured and a calculator which can communicate with the sensor terminals. Each of the sensor terminals includes a sensor element which acquires vibration information of the target to be measured, an arithmetic unit which performs a process for reducing an amount of data including the vibration information of the sensor terminal, and a communication unit which transmits data processed by the arithmetic unit to the calculator. The calculator complements the reduction-processed data to acquire vibration information, averages the vibration information for a predetermined period of time, and detects a state of a target to be measured based on the averaged vibration information.

A monitoring system includes a plurality of sensor terminals which are installed for a target object to be measured and a calculator which can communicate with the sensor terminals. The calculator transmits setting information including thinning information of a frequency space to each of the sensor terminals. The sensor terminal includes a sensor element which acquires vibration information of the target to be measured, an arithmetic unit which performs thinning of a frequency section for data including the vibration information of the sensor element and an arithmetic operation including a process for reducing an amount of data, and a communication unit which transmits the data processed by the arithmetic unit to the calculator. The calculator complements the reduction-processed data and acquires second vibration information, and detects a state of the target to be measured based on the second vibration information.

What is claimed is:
1. A monitoring system comprising:
a plurality of sensor terminals which are installed for a target object to be measured;
a base station which wirelessly communicates with the sensor terminals; and
a calculator which can communicate with the base station,
wherein each of the sensor terminals includes a sensor element which acquires vibration information of the target to be measured, an arithmetic unit which performs an arithmetic operation for data including the vibration information of the sensor terminal, and a wireless communication unit,
the arithmetic unit performs a reduction process for reducing an amount of data of the sensor element, the wireless communication unit transmits data processed by the arithmetic unit to the base station, the base station receives the transmitted data, and transmits it to the calculator, the calculator includes a signal processing unit, and the signal processing unit complements the reduction-processed data to acquire vibration information, and averages the vibration information for a predetermined period, wherein each sensor element acquires respective vibration information of the target to be measured, for a respective period of time, the period of time being between two and three times a length of time during which a synchronization error can occur between each of the sensor terminals acquiring vibration information.

2. The monitoring system according to claim 1, wherein the signal processing unit removes a spike noise from the vibration information, thereafter averaging the vibration information for a predetermined period of time.

3. The monitoring system according to claim 1,
wherein the arithmetic unit sequentially performs a Fourier transform, data removal except a particular band, and an inverse-Fourier transform, and
the signal processing unit sequentially performs Fourier transform and complements a band after the data removal, to acquire vibration information.

4. The monitoring system according to claim 1,
wherein the arithmetic unit sequentially performs Fourier transform, data removal except a particular band, thinning of a frequency space, and inverse-Fourier transform, and
the signal processing unit performs Fourier transform, complements a band after the data removal, and complements the thinned data points in a frequency space, to acquire vibration information.

5. The monitoring system according to claim 1,
wherein the arithmetic unit sequentially performs Fourier transform, data removal except a particular band, and thinning of a frequency space, and
the signal processing unit sequentially performs complementing a band after the data removal, and complements the thinned data points in a frequency space, to acquire vibration information.

6. The monitoring system according to claim 1,
wherein the calculator transmits data process setting to the sensor terminal through the base station, and
the arithmetic unit sets an arithmetic parameter based on the data process setting.

7. The monitoring system according to claim 1,
wherein the arithmetic unit performs a reduction process for reducing an amount of data of the sensor element, and performs quantization after normalizing the data, and
the wireless communication unit transmits the data processed by the arithmetic unit to the base station, together with quantization information.

8. The monitoring system according to claim 1,
wherein the signal processing unit:
complements the reduction-processed data to acquire vibration information;
stores the vibration information as complex spectrum data;
calculates power spectrums from the complex spectrum data;
averages the power spectrums for a predetermined period of time, and calculates an averaging power spectrum;
performs an inverse-Fourier transform for the averaging power spectrum, and calculates a self-correlation function; and
acquires a maximum value of the self-correlation function, and stores the maximum value as single average data.

9. The monitoring system according to claim 1,
wherein the signal processing unit:
reads a pair list for specifying two sensor terminals;
complements the reduction-processed data to acquire vibration information;
stores the vibration information as complex spectrum data;
calculates a cross spectrum from the complex spectrum data, based on the pair list;
averages the cross spectrum for a predetermined period of time, and calculates an averaging cross spectrum;
performs inverse-Fourier transform for the averaging cross spectrum, and calculates a mutual correlation function; and
acquires a maximum value of the mutual correlation function, and stores the maximum value as pair average data.

10. The monitoring system according to claim 1,
wherein the signal processing unit:
complements the reduction-processed data to acquire vibration information;
stores the vibration information as complex spectrum data;
calculates power spectrums from the complex spectrum data;
averages the power spectrum for a predetermined period, and calculates an averaging power spectrum;
extracts an intensity of a particular band from the averaging power spectrum; and
stores the intensity of the particular band as single data.

11. The monitoring system according to claim 1,
wherein the signal processing unit:
reads a pair list for specifying two sensor terminals;
complements the reduction-processed data to acquire vibration information;
store the vibration information as complex spectrum data;
calculates a cross spectrum from the complex spectrum data based on the pair list;
averages the cross spectrum for a predetermined period of time, and calculates an averaging cross spectrum;
extracts an intensity of a particular band from the averaging cross spectrum; and
stores the intensity of the particular band as pair data.

12. A monitoring method, using a plurality of sensor terminals installed for a target to be measured, a base station wirelessly communicating with the sensor terminals, and a calculator communicable with the base station, the method comprising the steps of:
including a sensor element which acquires vibration information for a target to be measured, an arithmetic unit which performs an arithmetic operation for data including the vibration information of the sensor element, and a wireless communication unit, in the sensor terminal;
performing a reduction process for reducing an amount of data of the sensor element, and quantizing it, in the arithmetic unit;
transmitting the data processed by the arithmetic unit to the base station, in the wireless communication unit;

receiving the transmitted data, and then transmitting it to the calculator, in the base station;

including a signal processing unit in the calculator; and complementing the reduction-processed data to acquire vibration information, and averaging the vibration information for a predetermined period of time, in the signal processing unit, wherein each sensor element acquires respective vibration information of the target to be measured, for a respective period of time, the period of time being between two and three times a length of time during which a synchronization error can occur between each of the sensor terminals in acquiring vibration information.

13. The monitoring method according to claim 12, further comprising the step of after removing a spike noise from the vibration information, averaging the vibration information for a predetermined period of time, in the signal processing unit.

* * * * *